US012309736B2

(12) United States Patent
Youn et al.

(10) Patent No.: US 12,309,736 B2
(45) Date of Patent: May 20, 2025

(54) COMMUNICATION RELATED TO MULTIPLE USIMS

(71) Applicant: LG ELECTRONICS INC., Seoul (KR)

(72) Inventors: Myungjune Youn, Seoul (KR); Sungduck Chun, Seoul (KR); Laeyoung Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 402 days.

(21) Appl. No.: 17/790,586

(22) PCT Filed: Dec. 11, 2020

(86) PCT No.: PCT/KR2020/018177
§ 371 (c)(1),
(2) Date: Jul. 1, 2022

(87) PCT Pub. No.: WO2021/141260
PCT Pub. Date: Jul. 15, 2021

(65) Prior Publication Data
US 2023/0045765 A1    Feb. 9, 2023

(30) Foreign Application Priority Data
Jan. 6, 2020    (KR) .................. 10-2020-0001667

(51) Int. Cl.
*H04W 60/00*    (2009.01)
*H04W 88/06*    (2009.01)

(52) U.S. Cl.
CPC .......... *H04W 60/005* (2013.01); *H04W 88/06* (2013.01)

(58) Field of Classification Search
None
See application file for complete search history.

(56) References Cited

U.S. PATENT DOCUMENTS

2011/0065435 A1*    3/2011    Pancorbo Marcos .................. H04W 76/22
                                                                        455/436
2017/0280507 A1*    9/2017    Wang ................ H04W 74/0833

FOREIGN PATENT DOCUMENTS

WO    2017136078    8/2017

OTHER PUBLICATIONS

Ericsson, "MUSIM solutions for Key Issue 3," SA WG2 Meeting #136, S2-1911115, Nov. 2019.
LG Electronics, "Solution: MT Service notification for MUSIM UE," 3GPP TSG-SA2 Meeting #136, S2-1911482, Nov. 2019.
(Continued)

*Primary Examiner* — Frantz Bataille
(74) *Attorney, Agent, or Firm* — BRYAN CAVE LEIGHTON PAISNER LLP

(57) ABSTRACT

One disclosure of the present specification provides a method by which a first network node performs communication on the basis of multiple USIMs. The method can comprise: receiving, from a UE, a registration request message including MT service configuration information; receiving, from the UE, information informing that the UE leaves a first network including the first network node; receiving, from a second network node, information related to downlink data about the UE; and transmitting a paging message or a failure indication on the basis of the MT service configuration information and the information related to the downlink data.

9 Claims, 18 Drawing Sheets

(56) References Cited

OTHER PUBLICATIONS

3rd Generation Partnership Project; Technical Specification Group Services and System Aspects; Study on Support for Multi-USIM Devices (Release 17), 3GPP TR 22.834, Dec. 2019.
Nokia, et al., Solution for improved paging in MUSIM devices (KI#1,2,3), S2-1911673, SA WG2 Meeting #136, Reno, Nevada, USA, Nov. 8, 2019, see pp. 1-6; and figures 6.x.3.1-1 and 6.x.3.2-2.
Huawei et al., Solution for KI#3, RAN based UE initiated release request, S2-1911692, SA WG2 Meeting #136, Reno, Nevada, USA, Nov. 8, 2019, see pp. 1-2.
Intel et al., Solution for handling of MT service, S2-1912406, SA WG2 Meeting #136, Reno, Nevada, Nov. 21, 2019, see pp. 1-3.
Ericsson, Availability after DDN notification for eDRX, S2-1904014, 3GPP TSG-SA WG2 Meeting #1 32, Xi'an, China, May 23, 2019, see pp. 2-3; and figure 5.7.1.3-1.
LG Electronics, Solution: Selective MT Service Configuration, S2-2000651, 3GPP TSG-SA2 Meeting #136-AH, Incheon, Korea, Jan. 7, 2020, see pp. 1-4; and figure 6.X.3.1-1.

* cited by examiner

COMMUNICATION RELATED TO MULTIPLE USIMS

This application is the National Stage filing under 35 U.S.C. 371 of International Application No. PCT/KR2020/ 018177 filed on Dec. 11, 2020, which claims priority to Korean Patent Application No. 10-2020-0001667 filed on Jan. 6, 2020, the contents of which are all hereby incorporated by reference herein in their entirety.

TECHNICAL FIELD

The present specification relates to mobile communication.

BACKGROUND

With the success of Evolved Universal Terrestrial Radio Access Network (E-UTRAN) for the fourth-generation mobile communication which is Long Term Evolution (LTE)/LTE-Advanced (LTE-A), the next generation mobile communication, which is the fifth-generation (so called 5G) mobile communication, has been attracting attentions and more and more researches are being conducted.

For the fifth-generation (so called 5G) mobile communication, a new radio access technology (New RAT or NR) have been studied and researched.

The fifth-generation communication defined by the International Telecommunication Union (ITU) refers to providing a maximum data transmission speed of 20 Gbps and a maximum transmission speed of 100 Mbps per user in anywhere. It is officially called "IMT-2020" and aims to be released around the world in 2020.

Meanwhile, in the 3rd Generation Partnership Project (3GPP) based system (eg, 4G network/5G network), it is basically assumed that one UE has one Universal Subscriber Identity Module (USIM).

However, among the actually released UEs, UEs supporting dual or multi USIM have been released. In particular, in some countries, UEs supporting multiple USIMs are mainstream.

However, since the operation for dual or multi USIM is not defined in the 3GPP standard, there is a problem in that the UE cannot communicate smoothly. In addition, there is a problem that the network cannot effectively support communication based on dual or multi USIM.

SUMMARY

Accordingly, a disclosure of the present specification has been made in an effort to solve the aforementioned problem.

In order to solve the above problems, one disclosure of the present specification provides a method for a first network node to perform communication based on a plurality of USIMs. The method includes: receiving a registration request message including MT service configuration information from the UE; receiving information from the UE indicating that the UE leaves a first network including the first network node; receiving information related to downlink data for the UE from a second network node; and transmitting a paging message or a failure indication based on the downlink data related information and the MT service configuration information.

In order to solve the above problems, one disclosure of the present specification provides a method for a UE to perform communication related to a plurality of USIMs. The method includes transmitting a registration request message including MT service configuration information to a first network node; receiving, from the first network node, a registration acceptance message including MT service configuration Accepted information indicating that the MT service configuration information has been accepted in response to the registration request message; and transmitting information indicating that the UE leaves the first network to the first network node.

In order to solve the above problems, one disclosure of the present specification provides a first network node that performs communication related to a plurality of USIMs. The first network node includes at least one processor; and at least one memory that stores instructions and is operably electrically connectable with the at least one processor, wherein the operations performed based on the instructions being executed by the at least one processor include: receiving a registration request message including MT service configuration information; receiving information from the UE indicating that the UE leaves a first network including the first network node; receiving information related to downlink data for the UE from a second network node; and transmitting a paging message or a failure indication based on the downlink data related information and the MT service configuration information.

In order to solve the above problems, one disclosure of the present specification provides a UE performing communication related to a plurality of USIMs. The UE includes at least one processor; and at least one memory for storing instructions and operably electrically connectable with the at least one processor, wherein the operations performed based on the instructions being executed by the at least one processor include: MT service transmitting a registration request message including setting information to the first network node; receiving, from the first network node, a registration acceptance message including MT service configuration Accepted information indicating that the MT service configuration information has been accepted in response to the registration request message; and transmitting information indicating that the UE leaves the first network to the first network node.

In order to solve the above problems, one disclosure of the present specification provides an apparatus in mobile communication. The apparatus includes at least one processor; and at least one memory that stores instructions and is operably electrically connectable with the at least one processor, wherein the instructions are executed based on execution by the at least one processor. The operations include: identifying a registration request message including MT service configuration information received from the UE; identifying information indicating that the UE is leaving a first network including the first network node, received from the UE; identifying information related to downlink data for the UE received from a network node; and generating a paging message or a failure indication based on the downlink data related information and the MT service configuration information.

In order to solve the above problems, one disclosure of the present specification provides a non-volatile computer-readable storage medium in which instructions are recorded. The instructions, when executed by one or more processors, cause the one or more processors to: identify a registration request message including MT service configuration information received from the UE; identifying information indicating that the UE is leaving a first network including the first network node, received from the UE; identifying information related to downlink data for the UE received from a network node; and generating a paging message or a failure indication based on the downlink data related information and the MT service configuration information.

According to the disclosure of the present specification, it is possible to solve the problems of the prior art.

Effects that can be obtained through specific examples of the present specification are not limited to the effects listed above. For example, various technical effects that a person having ordinary skill in the related art can understand or derive from the present specification may exist. Accordingly, the specific effects of the present specification are not limited to those explicitly described herein, and may include various effects that can be understood or derived from the technical characteristics of the present specification.

DESCRIPTION OF EXEMPLARY EMBODIMENTS

Figure 1:
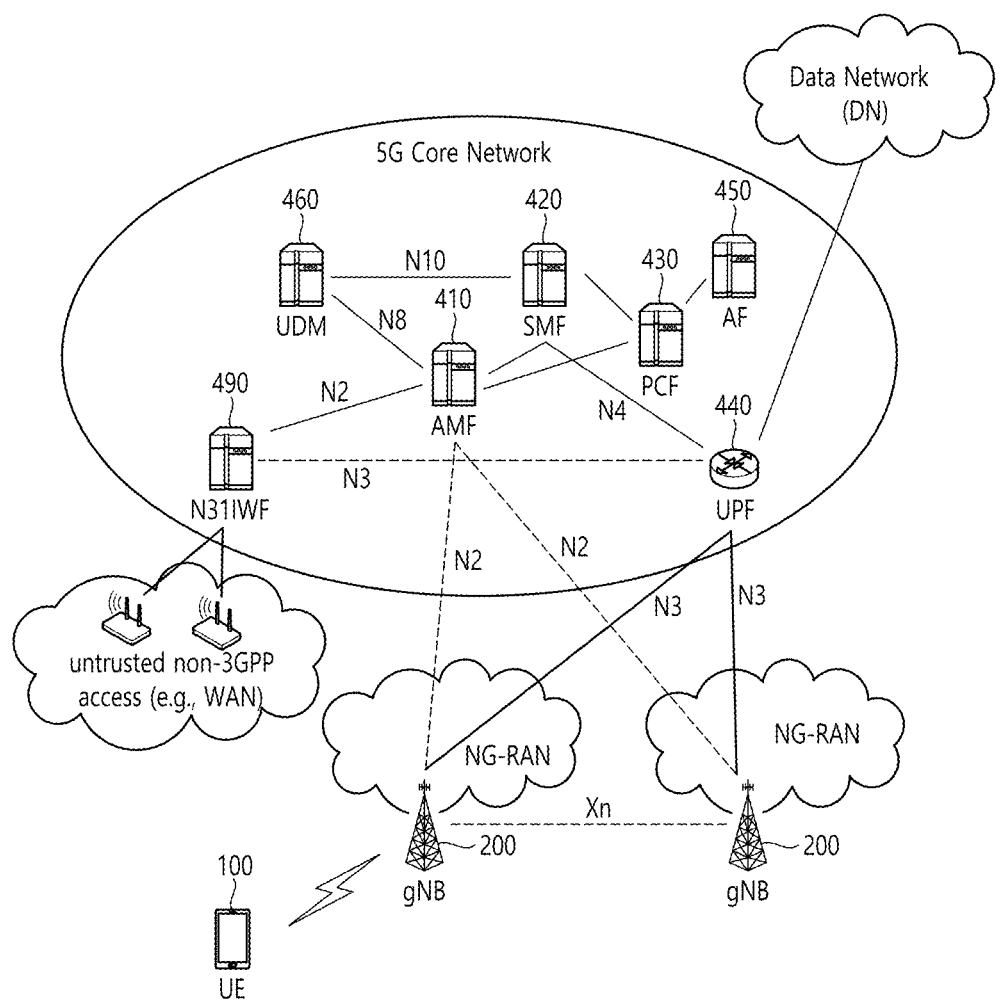
FIG. 1 is a structural diagram of a next-generation mobile communication network.

The technical terms used herein are used to merely describe specific embodiments and should not be construed as limiting the present specification. Further, the technical terms used herein should be, unless defined otherwise, interpreted as having meanings generally understood by those skilled in the art but not too broadly or too narrowly. Further, the technical terms used herein, which are determined not to exactly represent the spirit of the specification, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present specification.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present specification will be described in greater detail with reference to the accompanying drawings. In describing the present specification, for ease of understanding, the same reference numerals are used to denote the same components throughout the drawings, and repetitive description on the same components will be omitted. Detailed description on well-known arts which are determined to make the gist of the specification unclear will be omitted. The accompanying drawings are provided to merely make the spirit of the specification readily understood, but not should be intended to be limiting of the specification. It should be understood that the spirit of the specification may be expanded to its modifications, replacements or equivalents in addition to what is shown in the drawings.

As used herein, "A or B" may mean "only A", "only B", or "both A and B". In other words, "A or B" herein may be understood as "A and/or B". For example, "A, B or C" herein means "only A", "only B", "only C", or any combination of A, B and C (any combination of A, B and C)".

As used herein, a slash (/) or a comma may mean "and/or". For example, "A/B" may mean "A and/or B". Accordingly, "A/B" may mean "only A", "only B", or "both A and B". For example, "A, B, C" may mean "A, B, or C".

As used herein, "at least one of A and B" may mean "only A", "only B", or "both A and B". In addition, the expression "at least one of A or B" or "at least one of A and/or B" may be understood as "At least one of A and B".

In addition, in this specification, "at least one of A, B and C" may mean "only A", "only B", "only C", or "any combination of A, B and C". In addition, "at least one of A, B or C" or "at least one of A, B and/or C" may mean "at least one of A, B and C".

In addition, the parentheses used herein may mean "for example". In detail, when "control information (PDCCH (Physical Downlink Control Channel))" is written herein, "PDCCH" may be proposed as an example of "control information". In other words, "control information" of the present specification is not limited to "PDCCH", and "PDDCH" may be proposed as an example of "control information". In addition, even when "control information (i.e. PDCCH)" is written, "PDCCH" may be proposed as an example of "control information".

The technical features individually described in one drawing in this specification may be implemented separately or at the same time.

In the accompanying drawings, a user equipment (UE) is illustrated by way of example, but the illustrated UE may also be referred to in terms of UE 100 (terminal), mobile equipment (ME), and the like. In addition, the UE may be a portable device such as a notebook computer, a mobile phone, a PDA, a smartphone, or a multimedia device or may be a non-portable device such as a PC or vehicle-mounted device.

Hereinafter, the UE is used as an example of a wireless communication device (or a wireless device, or a wireless device) capable of wireless communication. An operation performed by the UE may be performed by a wireless communication device. A wireless communication device may also be referred to as a wireless device, a wireless device, or the like. Hereinafter, AMF may mean an AMF node, SMF may mean an SMF node, and UPF may mean a UPF node.

A base station, a term used below, generally refers to a fixed station communicating with a wireless device, and it may be called another term such as an evolved-NodeB (eNodeB), an evolved-NodeB (eNB), a BTS (Base Transceiver System), an access point (Access Point), gNB (Next generation NodeB), etc.

I. Techniques and Procedures Applicable to the Disclosure of the Present Specification FIG. 1 is a structural diagram of a next-generation mobile communication network.

5GC (5G Core) may include various components, part of which are shown in FIG. 1, including an access and mobility management function (AMF) 410, a session management function (SMF) 420, a policy control function (PCF) 430, a User Plane Function (UPF) 440, an application function (AF) 450, a unified data management (UDM) data network 460, and a non-3GPP (3rd Generation Partnership Project) interworking function (N3IWF) 490.

A UE 100 is connected to a data network via the UPF 440 through a Next Generation Radio Access Network (NG-RAN) including the gNB 200.

The UE 100 may be provided with a data service even through untrusted non-3GPP access, e.g., a wireless local area network (WLAN). In order to connect the non-3GPP access to a core network, the N3IWF 490 may be deployed.

The illustrated N3IWF 490 performs a function of managing interworking between the non-3GPP access and the 5G system. When the UE 100 is connected to non-3GPP access (e.g., WiFi referred to as IEEE 801.11), the UE 100 may be connected to the 5G system through the N3IWF 490. The N3IWF 490 performs control signaling with the AMF 410 and is connected to the UPF 440 through an N3 interface for data transmission.

The illustrated AMF 410 may manage access and mobility in the 5G system. The AMF 410 may perform a function of managing NAS security. The AMF 410 may perform a function of handling mobility in an idle state.

The illustrated UPF 440 is a type of gateway through which user data is transmitted/received. The UPF 440 may perform the entirety or a portion of a user plane function of a serving gateway (S-GW) and a packet data network gateway (P-GW) of 4G mobile communication.

The UPF 440 operates as a boundary point between a next generation radio access network (NG-RAN) and the core network and maintains a data path between the gNB 200 and the SMF 420. In addition, when the UE 100 moves over an area served by the gNB 200, the UPF 440 serves as a mobility anchor point. The UPF 440 may perform a function of handling a PDU. For mobility within the NG-RAN (which is defined after 3GPP Release-15), the UPF 440 may route packets. In addition, the UPF 54 may also serve as an anchor point for mobility with another 3GPP network (RAN defined before 3GPP Release-15, e.g., universal mobile telecommunications system (UMTS) terrestrial radio access network (UTRAN), evolved (E)-UTRAN or global system for mobile communication (GERAN)/enhanced data rates for global evolution (EDGE) RAN. The UPF 440 may correspond to a termination point of a data interface toward the data network.

The illustrated PCF 430 is a node that controls an operator's policy.

The illustrated AF 450 is a server for providing various services to the UE 100.

The illustrated UDM 460 is a kind of server that manages subscriber information, such as home subscriber server (HSS) of 4G mobile communication. The UDM 460 stores and manages the subscriber information in a unified data repository (UDR).

The illustrated SMF 420 may perform a function of allocating an Internet protocol (IP) address of the UE. In addition, the SMF may control a protocol data unit (PDU) session.

For reference, hereinafter, reference numerals for AMF (410), SMF (420), PCF (430), UPF (440), AF (450), UDM (460), N3IWF (490), gNB (20), or UE (10) may be omitted.

The 5th generation mobile communication supports a plurality of numerologies (e.g. a plurality of values of subcarrier spacing (SCS)) in order to support various services. For example, when the SCS is 15 kHz, a wide area in traditional cellular bands is supported. When the SCS is 30 kHz/60 kHz, a dense-urban, lower-latency, and wider carrier bandwidth is supported. When the SCS is 60 kHz or greater, a bandwidth greater than 24.25 GHz is supported in order to overcome phase noise.

The NR frequency band may be defined as two types of frequency ranges (FR1, FR2). The numerical value of the frequency range may be changed, and for example, the frequency ranges of the two types (FR1, FR2) may be as shown in Table 1 below. For convenience of explanation, among the frequency ranges used in the NR system, FR1 may mean "sub 6 GHz range" and FR2 may mean "above 6 GHz range" and may be called millimeter wave (mmWave).

TABLE 1

| Frequency Range designation | Corresponding frequency range | Subcarrier Spacing |
|---|---|---|
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system can be changed. For example, FR1 may include a band of 4100 MHz to 7125

MHz as shown in Table 2 below. That is, FR1 may include a frequency band of 6 GHz (or 5850, 5900, 5925 MHz, etc.) or more. For example, a frequency band of 6 GHz (or 5850, 5900, 5925 MHz, etc.) or higher included in FR1 may include an unlicensed band. The unlicensed band may be used for various purposes, for example, for communication for a vehicle (eg, autonomous driving).

TABLE 2

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 2:
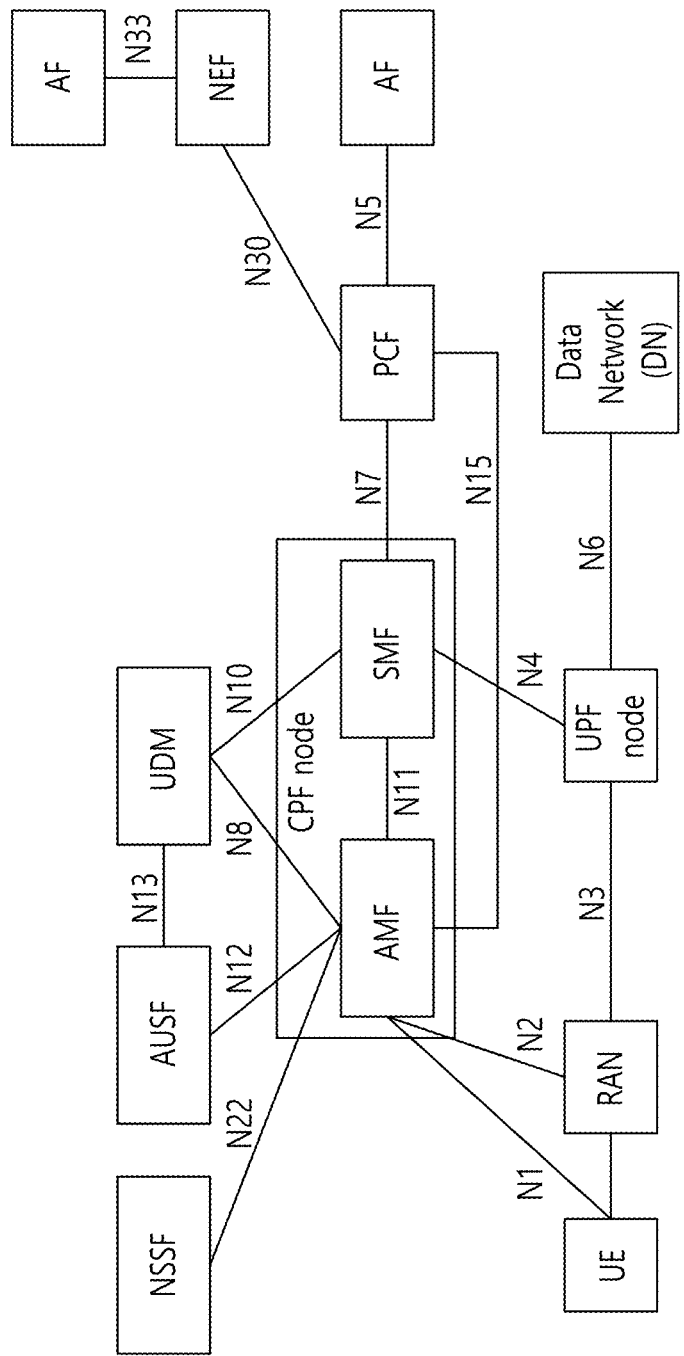
FIG. 2 is an exemplary diagram illustrating a predicted structure of a next generation mobile communication in terms of a node.

FIG. 2 is an exemplary diagram illustrating a predicted structure of a next generation mobile communication in terms of a node. Referring to FIG. 2, the UE is connected to a data network (DN) through a next generation RAN (Radio Access Network).

The Control Plane Function (CPF) node shown in FIG. 2 may perform all or part of the Mobility Management Entity (MME) function of the fourth generation mobile communication, and all or a part of the control plane function of the Serving Gateway (S-GW) and the PDN-gateway (P-GW) of the fourth generation mobile communication. The CPF node includes an Access and Mobility Management Function (AMF) node and a Session Management Function (SMF) node.

The user plane function (UPF) node shown in the drawing is a type of a gateway over which user data is transmitted and received. The UPF node may perform all or part of the user plane functions of the S-GW and the P-GW of the fourth generation mobile communication.

The Policy Control Function (PCF) node shown in FIG. 2 is configured to control a policy of the service provider.

The illustrated Application Function (AF) node refers to a server for providing various services to the UE.

The Unified Data Management (UDM) node as shown refers to a type of a server that manages subscriber information, such as a Home Subscriber Server (HSS) of 4th generation mobile communication. The UDM node stores and manages the subscriber information in the Unified Data Repository (UDR).

The Authentication Server Function (AUSF) node as shown authenticates and manages the UE.

The Network Slice Selection Function (NSSF) node as shown refers to a node for performing network slicing as described below.

The illustrated Network Exposure Function (NEF) is a node for providing a mechanism to securely expose services and functions of the 5G core. For example, NEF exposes functions and events, securely provides information from external applications to the 3GPP network, translates internal/external information, provides control plane parameters, and manages packet flow description (PFD).

Figure 3:
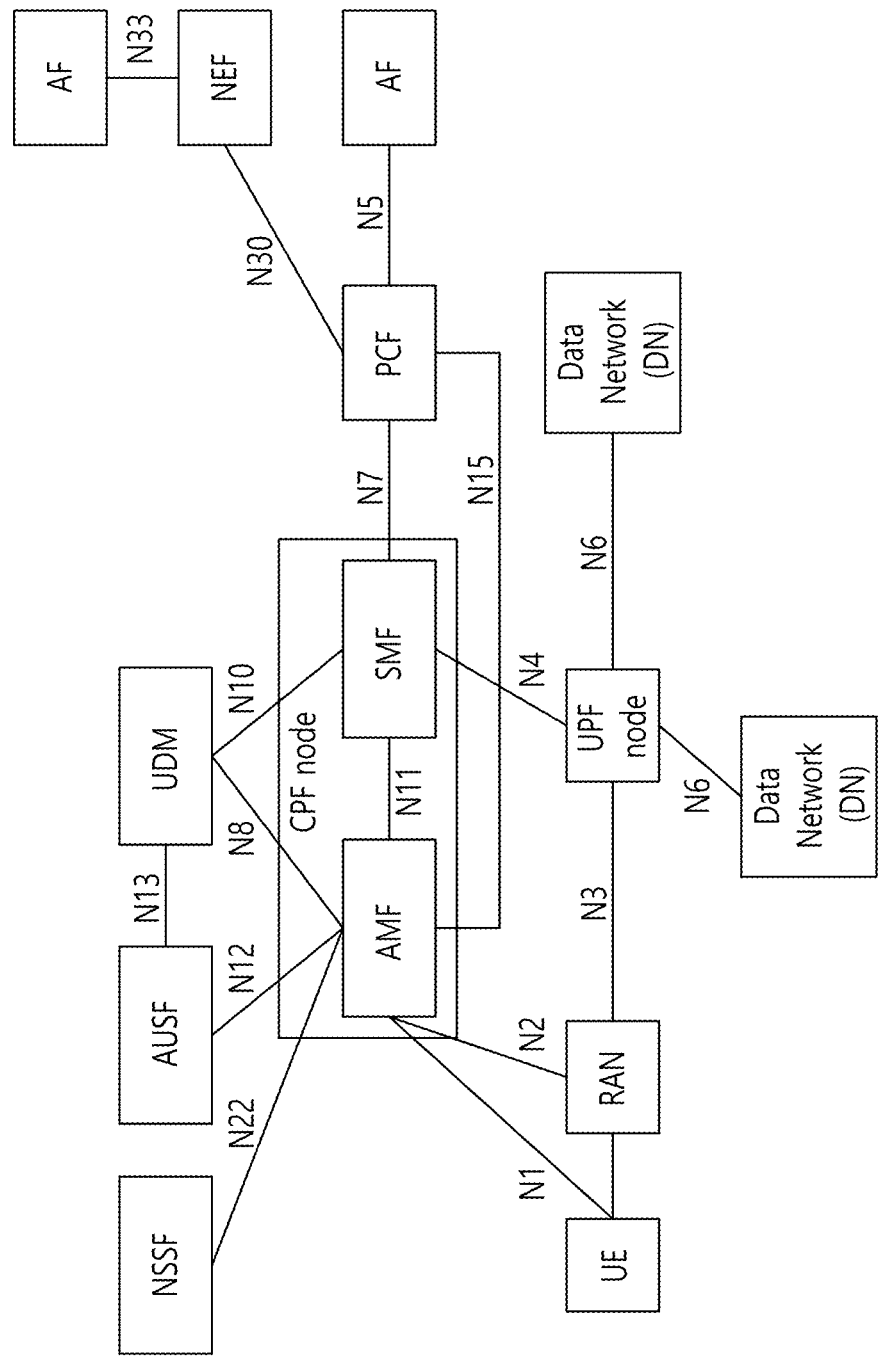
FIG. 3 is an exemplary diagram illustrating an architecture for supporting a concurrent access through two data networks.

In FIG. 3, the UE may simultaneously access two data networks using multiple PDU sessions.

FIG. 3 illustrates an architecture that allows the UE to simultaneously access two data networks using one PDU session.

FIG. 3 illustrates an architecture that allows the UE to simultaneously access two data networks using one PDU session.

For reference, descriptions of the reference points shown in FIGS. 2 and 3 are as follows.

N1 represents Reference point between UE and AMF.
N2 represents Reference point between NG-RAN and AMF.
N3 represents Reference point between NG-RAN and UPF.
N4 represents Reference point between SMF and UPF.
N5 represents Reference point between PCF and AF.
N6 represents Reference point between UPF and DN.
N7 represents Reference point between SMF and PCF.
N8 represents Reference point between UDM and AMF.
N9 represents Reference point between UPFs.
N10 represents Reference point between UDM and SMF.
N11 represents Reference point between AMF and SMF.
N12 represents Reference point between AMF and AUSF.
N13 represents Reference point between UDM and AUSF.
N14 represents Reference point between AMFs.
N15 represents Reference point between PCF and AMF in a non-roaming scenario and reference point between AMF and PCF of visited network in roaming scenario.
N16 represents Reference point between SMFs.
N22 represents Reference point between AMF and NSSF.
N30 represents Reference point between PCF and NEF.
N33 represents Reference point between AF and NEF.

In FIGS. 2 and 3, AF by a third party other than an operator may be connected to 5GC through a network exposure function (NEF).

Figure 4:
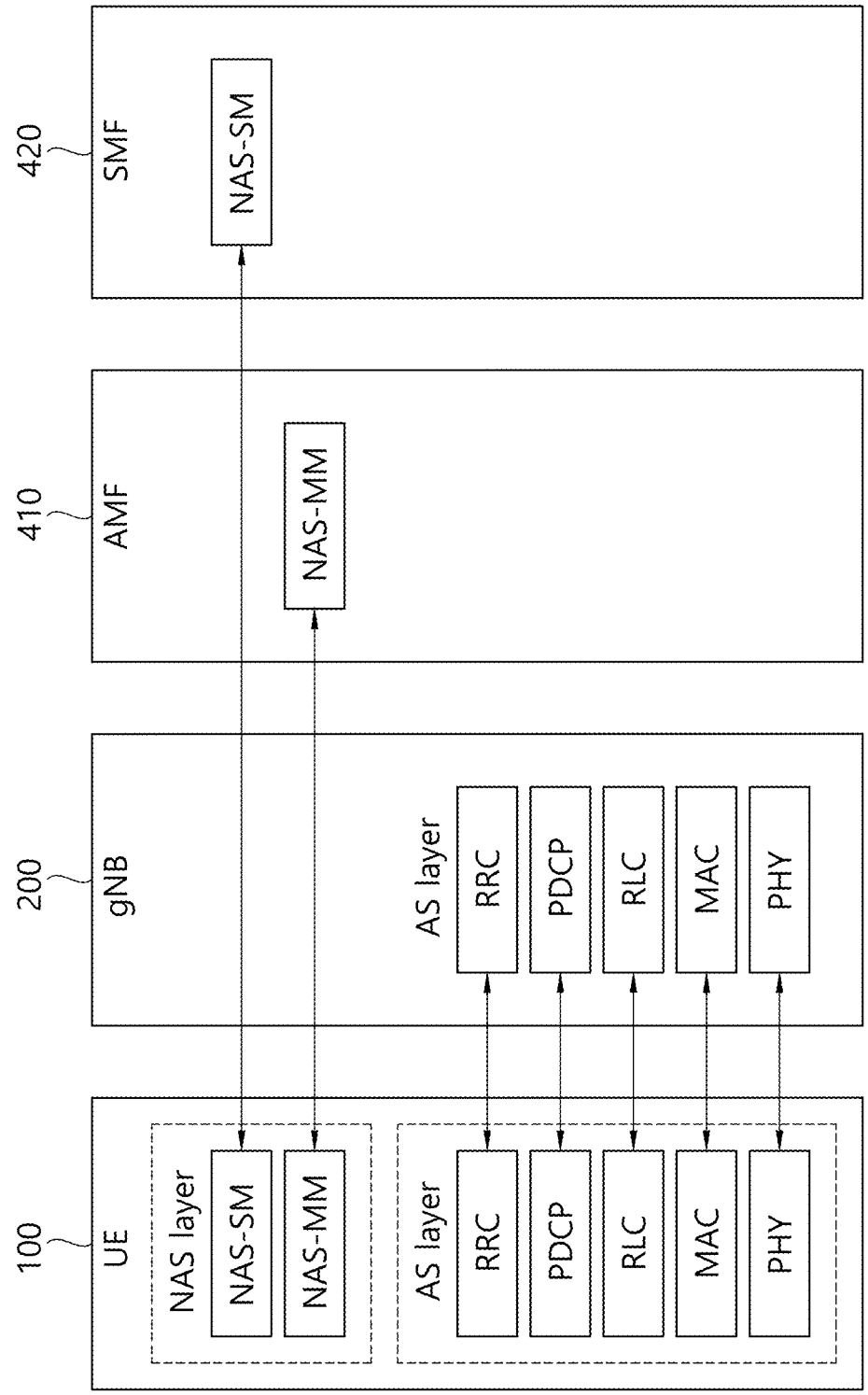
FIG. 4 is another exemplary diagram showing a structure of a radio interface protocol between a UE and a gNB.

FIG. 4 is another exemplary diagram showing a structure of a radio interface protocol between a UE and a gNB.

The radio interface protocol is based on the 3GPP radio access network standard. The radio interface protocol is horizontally composed of a physical layer, a data link layer, and a network layer, and is vertically divided into a user plane for transmission of data information and a control plane for transfer of control signal (signaling).

The protocol layers may be divided into L1 (first layer), L2 (second layer), and L3 layer (third layer) based on the lower three layers of the open system interconnection (OSI) reference model widely known in communication systems.

Hereinafter, each layer of the radio protocol will be described.

The first layer, the physical layer, provides an information transfer service using a physical channel. The physical layer is connected to an upper medium access control layer through a transport channel, and data between the medium access control layer and the physical layer is transmitted through the transport channel. In addition, data is transmitted between different physical layers, that is, between the physical layers of a transmitting side and a receiving side through a physical channel.

The second layer includes a medium access control (MAC) layer, a radio link control (RLC) layer, and a packet data convergence protocol (PDCP) layer.

The third layer includes radio resource control (hereinafter abbreviated as RRC). The RRC layer is defined only in the control plane and is in charge of control of logical channels, transport channels, and physical channels related to configuration, reconfiguration and release of radio bearers. In this case, RB refers to a service provided by the second layer for data transfer between the UE and the E-UTRAN.

The NAS layer performs functions such as connection management (session management) and mobility management.

The NAS layer is divided into a NAS entity for mobility management (MM) and a NAS entity for session management (SM).

1) NAS entity for MM provides the following functions in general.
 NAS procedures related to AMF include the following.
 Registration management and access management procedures. AMF supports the following functions.
 Secure NAS signal connection between UE and AMF (integrity protection, encryption)
2) The NAS entity for SM performs session management between the UE and the SMF.
 The SM signaling message is processed, that is, generated and processed, at an NAS-SM layer of the UE and SMF. The contents of the SM signaling message are not interpreted by the AMF.
 In the case of SM signaling transmission,
 The NAS entity for the MM creates a NAS-MM message that derives how and where to deliver an SM signaling message through a security header representing the NAS transmission of SM signaling and additional information on a received NAS-MM.
 Upon receiving SM signaling, the NAS entity for the SM performs an integrity check of the NAS-MM message, analyzes additional information, and derives a method and place to derive the SM signaling message.
 Meanwhile, in FIG. 4, the RRC layer, the RLC layer, the MAC layer, and the PHY layer located below the NAS layer are collectively referred to as an access stratum (AS).

A network system (ie, 5GC) for next-generation mobile communication (ie, 5G) also supports non-3GPP access. An example of the non-3GPP access is typically a WLAN access. The WLAN access may include both a trusted WLAN and an untrusted WLAN.

In the system for 5G, AMF performs registration management (RM: Registration Management) and connection management (CM: Connection Management) for 3GPP access as well as non-3GPP access.

A Multi-Access (MA) PDU session using both 3GPP access and non-3GPP access may be used.

The MA PDU session is a PDU session that can be serviced simultaneously with 3GPP access and non-3GPP access using one PDU session.

<Registration Procedure>

The UE needs to obtain an authorization to enable mobility tracking, to enable data reception, and to receive services. For this, the UE must register with the network. The registration procedure is performed when the UE needs to do initial registration with the 5G system. In addition, the registration procedure is performed when the UE performs periodic registration update, when moving to a new tracking area (TA) whine the UE is in an idle mode, and when the UE needs to perform periodic registration update.

During the initial registration procedure, the ID of the UE may be obtained from the UE. AMF may deliver PEI (IMEISV) to UDM, SMF and PCF.

Figure 5A:
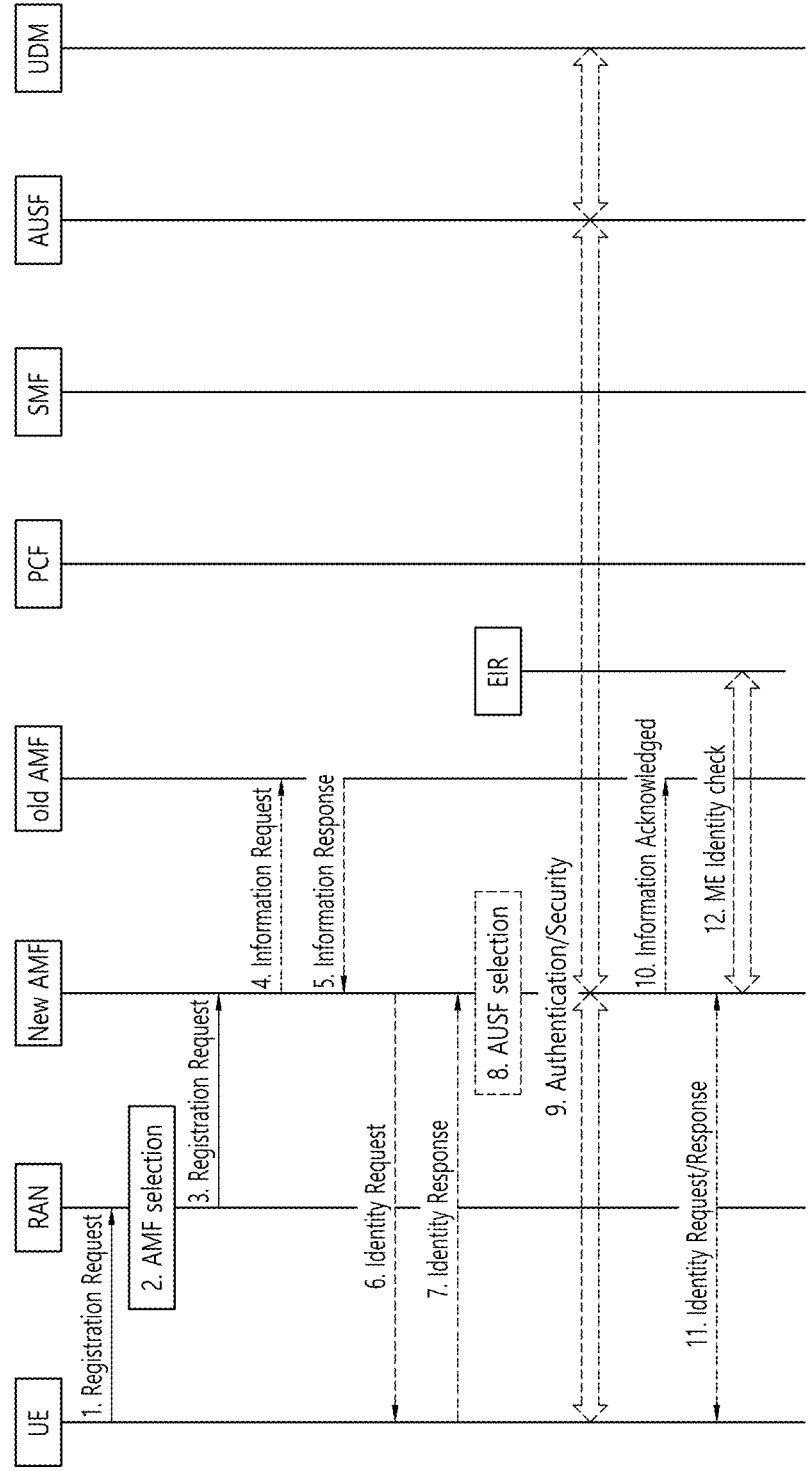
FIGS. 5*a* and 5*b* is a signal flow chart showing an exemplary registration procedure.
Figure 5B:
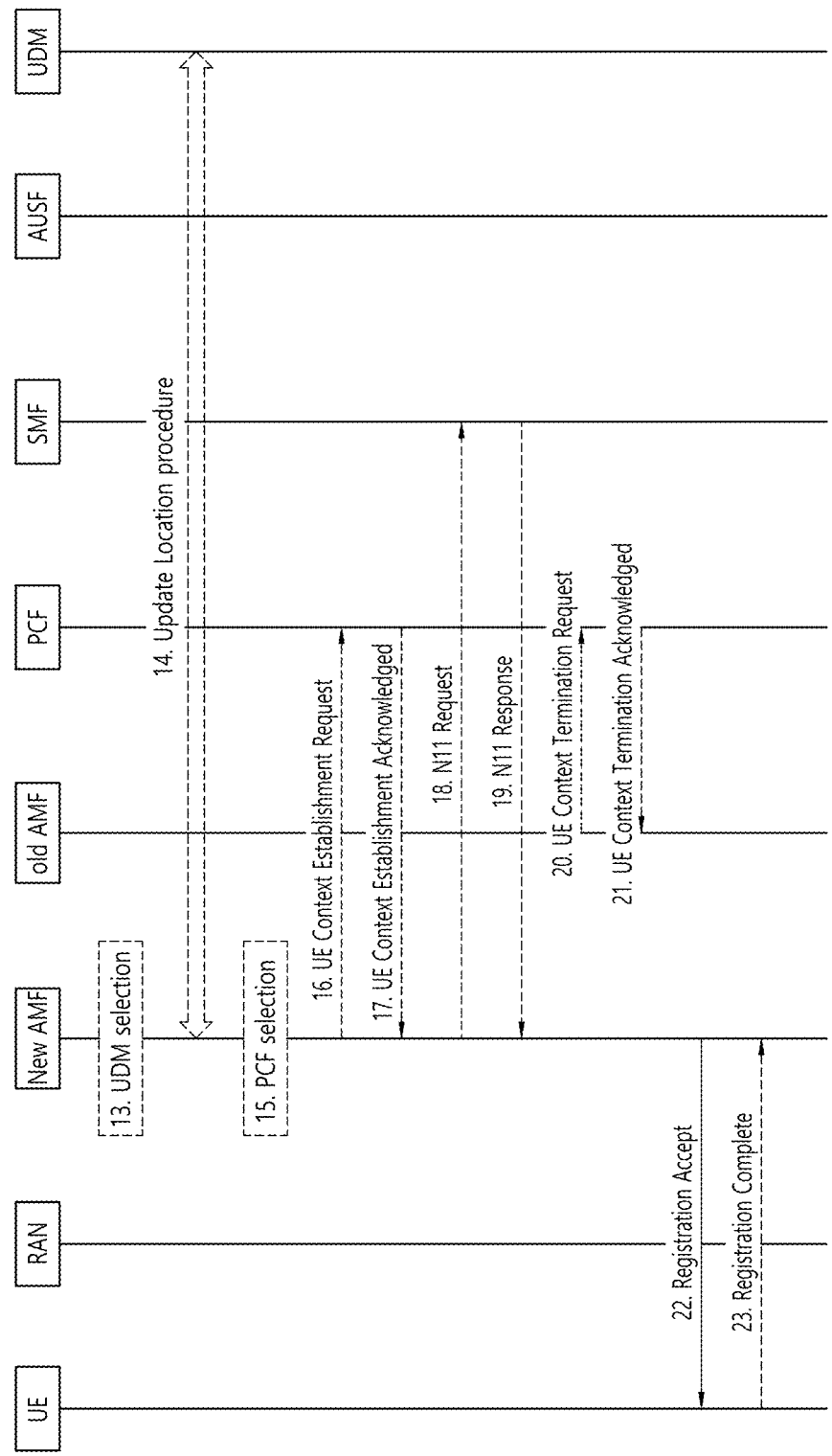

FIGS. 5a and 5b are signal flow charts showing an exemplary registration procedure.
 1) The UE may transmit an AN message to the RAN. The AN message may include an AN parameter and a registration request message. The registration request message may include information, such as a register type, a subscriber permanent ID or temporary user ID, a security parameter, NASSAI, 5G capability of the UE, a PDU (protocol data unit or packet data unit) session status, and so on.
 In case of a 5G RAN, the AN parameter may include a SUPI or a temporary user ID, a selected network, and NASSAI.
 The registration type may indicate whether the registration is an "initial registration" (i.e., the UE is in a non-registered state), "mobility registration update" (i.e., the UE is in a registered state, and the registration procedure is initiated by mobility), or "periodic registration update" (i.e., the UE is in a registered state, and the registration procedure is initiated due to the expiration of a periodic update timer).
 In case a temporary user ID is included, the temporary user ID indicates a last serving AMF. In case the UE has already been registered in a PLMN other than the PLMN of a 3GPP access through a non-3GPP access, the UE may not provide a UE temporary ID, which is allocated by the AMF during a registration procedure through the non-3GPP access.
 The security parameter may be used for authentication and integrity protection.
 The PDU session status indicates a PDU session that is available (and previously configured) in the UE.
 2) In case the SUPI is included, or in case the temporary user ID does not indicate a valid AMF, the RAN may select an AMF based on a (R)AT and NSSAI.
 In case the (R)AN cannot select an appropriate AMF, any AMF is selected according to a local policy, and the registration request is forwarded (or transferred) by using the selected AMF. If the selected AMF cannot provide service to the UE, the selected AMF may select another AMF that is more appropriate for the UE.
 3) The RAN transmits an N2 message to a new AMF. The N2 message includes an N2 parameter and a registration request. The registration request may include a registration type, a subscriber permanent identifier or temporary user ID, a security parameter, NSSAI, MICO mode default settings (or configuration), and so on.
 When a 5G-RAN is used, the N2 parameter includes location information related to a cell in which the UE is camping, a cell identifier, and a RAT type.
 If the registration type indicated by the UE is a periodic registration update, Process 4 to Process 17, which will be described in detail later on, may not be performed.
 4) The newly selected AMF may transmit an information request message to the previous AMF.
 In case the temporary user ID of the UE is included in a registration request message, and in case the serving AMF is changed after the last registration, a new AMF may include an information request message, which includes complete registration request information for requesting SUPI and MM context of the UE, to the previous (or old) AMF.
 5) The previous (or old) AMF transmits an information response message to the newly selected AMF. The information response message may include SUPI, MM context, and SMF information.
 More specifically, the previous (or old) AMF transmits an information response message including SUPI and MM context of the UE.
 In case information on an active PDU session is included in the previous (or old) AMF, SMF information including SMF ID and PDU session ID may be included in the information response message of the previous (or old) AMF.
 6) In case the SUPI is not provided by the UE, or in case the SUPI is not searched from the previous (or old) AMF, the new AMF transmits an Identity Request message to the UE.
 7) The UE transmits an Identity Response message including the SUPI to the new AMF.
 8) The AMF may determine to perform triggering of an AUSF. In this case, the AMF may select an AUSF based on the SUPI.
 9) The AUSF may initiate authentication of the UE and the NAS security function.

10) The new AMF may transmit an information response message to the previous (or old) AMF.

If the AMF is changed the new AMF may transmit the information response message in order to verify the forwarding of UE MM context.

If the authentication/security procedure is failed, the registration is rejected, and the new AMF may transmit a rejection message to the previous (or old) AMF.

11) The new AMF may transmit an Identity Request message to the UE.

In case a PEI is not provided by the UE, or in case a PEI is not searched from the previous (or old) AMF, an Identity Request message may be transmitted in order to allow the AMF to search the PEI.

12) The new AMF checks an ME identifier.

13) If Process 14, which will be described later on, is performed, the new AMF selects a UDM based on the SUPI.

14) If the AMF is modified after the final registration, if valid subscription context of the UE does not exist in the AMF, or if the UE provides a SUPI, wherein the AMF does not refer to a valid context, the new AMF initiates an Update Location procedure. Alternatively, even in a case where a UDM initiates Cancel Location for the previous AMF, the Update Location procedure may be initiated. The previous (or old) AMF discards the MM context and notifies all possible SMF(s), and, after obtaining AMF-related subscription data from the UDM, the new AMF generates MM context of the UE.

In case network slicing is used, the AMF obtains allowed NSSAI based on the requested NSSAI and UE subscription and local policy. In case the AMF is not appropriate for supporting the allowed NSSAI, the registration request is re-routed.

15) The new AMF may select a PCF based on the SUPI.

16) The new AMF transmits a UE Context Establishment Request message to the PCF. The AMF may request an operator policy for the UE to the PCF.

17) The PCF transmits a UE Context Establishment Acknowledged message to the new AMF.

18) The new AMF transmits an N11 request message to the SMF.

More specifically, when the AMF is changed, the new AMF notifies the new AMF that provides services to the UE to each SMF. The AMF authenticates the PDU session status from the UE by using available SMF information. In case the AMF is changed, the available SMF information may be received from the previous (or old) AMF. The new AMF may send a request to the SMF to release (or cancel) network resources related to a PDU session that is not activated in the UE.

19) The new AMF transmits an N11 response message to the SMF.

20) The previous (or old) AMF transmits a UE Context Termination Request message to the PCF.

In case the previous (or old) AMF has previously requested UE context to be configured in the PCF, the previous (or old) AMF may delete the UE context from the PCF.

21) The PCF may transmit a UE Context Termination Request message to the previous (or old) AMF.

22) The new AMF transmits a Registration Accept message to the UE. The Registration Accept message may include a temporary user ID, registration area, mobility restriction, PDU session status, NSSAI, periodic registration update timer, and allowed MICO mode.

The registration accept message may include information of the allowed NSSAI and the mapped NSSAI. The allowed NSSAI information for the access type of the UE may be included in the N2 message including the registration accept message. The information of the mapped NSSAI is information that maps each S-NSSAI (Session Network Slice Selection Assistance Information) of the allowed NSSAI (Network Slice Selection Assistance Information) to the S-NAS SI of the NSSAI configured for Home Public Land Mobile Network (HPLMN).

In case the AMF allocated a new temporary user ID, the temporary user ID may be further included in the Registration Accept message. In case the mobility restriction is applied to the UE, information indicating the mobility restriction may be additionally included in the Registration Accept message. The AMF may include information indicating the PDU session status for the UE in the Registration Accept message. The UE may remove any internal resource being related to a PDU session that is not marked as being active from the received PDU session status. If the PDU session status information is included in the Registration Request, the AMF may include the information indicating the PDU session status to the UE in the Registration Accept message.

23) The UE transmits a Registration Complete message to the new AMF.

<PDU Session Establishment Procedure>

For the PDU Session Establishment procedure, two different types of PDU Session Establishment procedures may exist as described below.

A PDU Session Establishment procedure initiated by the UE.

A PDU Session Establishment procedure initiated by the network. For this, the network may transmit a Device Trigger message to an application (or applications) of the UE.

Figure 6A:
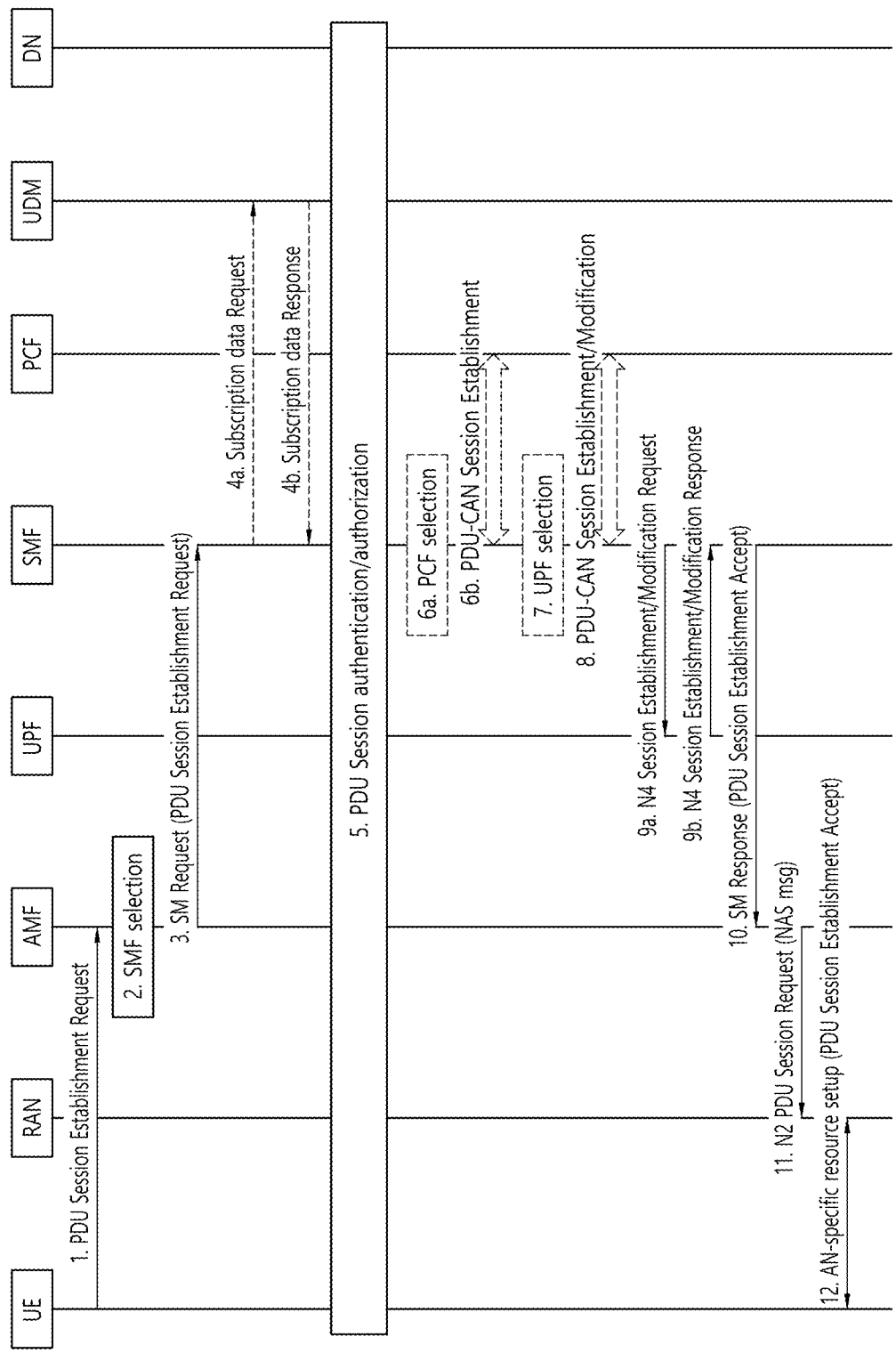
FIGS. 6*a* and 6*b* is a signal flowchart illustrating an exemplary PDU session establishment procedure.
Figure 6B:
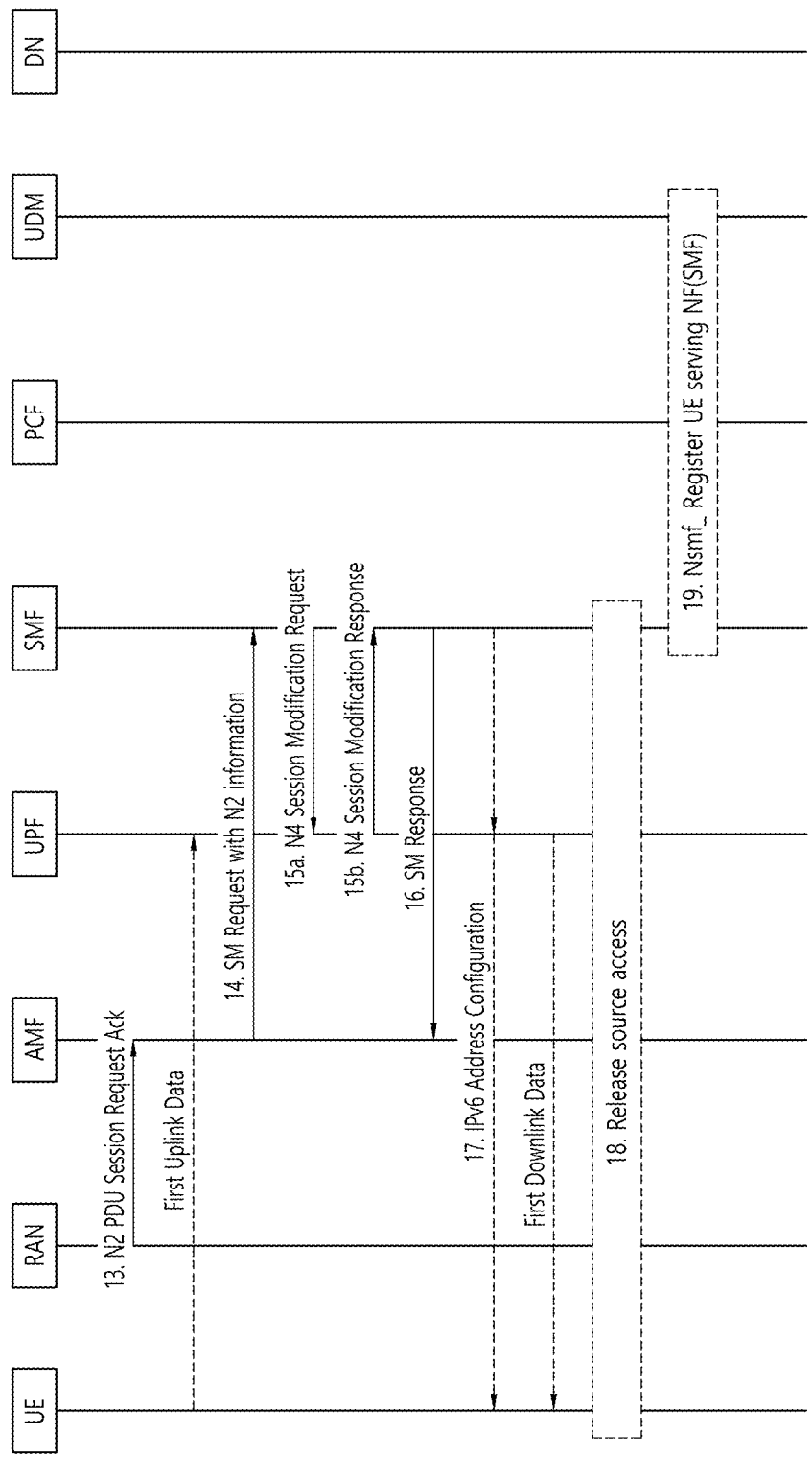

FIGS. 6a and 6b are a signal flowchart illustrating an exemplary PDU session establishment procedure.

The procedure shown in FIGS. 6a and 6b assumes that the UE has already registered on the AMF according to the registration procedure shown in FIGS. 5a and 5b. Therefore, it is assumed that the AMF has already acquired user subscription data from UDM.

1) The UE transmits a NAS message to the AMF. The message may include Single-Network Slice Selection Assistance Information (S-NSSAI), DNN, PDU session ID, a Request type, N1 SM information (including PDU Session Request), and so on.

Specifically, the UE includes the S-NSSAI from the allowed (allowed) NSSAI of the current access type. If information on the mapped NSSAI is provided to the UE, the UE may provide both the S-NSSAI based on the allowed NSSAI and the corresponding S-NSSAI based on the information of the mapped NSSAI. Here, the mapped NSSAI information is information that maps each S-NSSAI of the allowed NSSAI to the S-NASSI of the NSSAI configured for HPLMN.

More specifically, The UE may extract and store the information of the allowed S-NSSAI and the mapped S-NSSAI included in the registration accept message received from the network (ie, AMF) in the registration procedure of FIGS. 5a and 5b. Accordingly, the UE may transmit the PDU session establishment request message by including both the S-NSSAI based on the allowed NSSAI and the corresponding S-NSSAI based on the mapped NSSAI information.

In order to establish a new PDU session, the UE may generate a new PDU session ID.

By transmitting a NAS message having a PDU Session Establishment Request message included in N1 SM information, the PDU Session Establishment procedure that is initiated by the UE may be started. The PDU Session Establishment Request message may include a Request type, an SSC mode, and a protocol configuration option.

In case the PDU Session Establishment is for configuring a new PDU session, the Request type indicates "initial access". However, in case an existing PDU session exists between the 3GPP access and the non-3GPP access, the Request type may indicate an "existing PDU session".

The NAS message being transmitted by the UE is encapsulated within an N2 message by the AN. The N2 message is transmitted to the AMF and may include user location information and access technique type information.

The N1 SM information may include an SM PDU DN request container including information on a PDU session authentication performed by an external DN.

2) In case the request type indicates an "initial request", and in case the PDU session ID has not been used for the existing PDU session of the UE, the AMF may determine that the message corresponds to a request for a new PDU session.

If the NAS message does not include the S-NSSAI, the AMF may determine default S-NSSAI for the requested PDU session according to the UE subscription. The AMF may relate a PDU session ID with an ID of the SMF and may store the PDU session ID.

3) The AMF transmits an SM request message to the SMF. The SM request message may include a subscriber permanent ID, DNN, S-NSSAI, a PDU session ID, an AMD IF, N1 SM information, user location information, and an access technique type. The N1 SM information may include a PDU session ID and a PDU Session Establishment Request message.

The AMF ID is used for identifying an AMF providing services to the UE. The N1 SM information may include the PDU Session Establishment Request message, which is received from the UE.

4a) The SMF transmits a Subscriber Data Request message to the UDM. The Subscriber Data Request message may include a subscriber permanent ID and DNN.

In the above-described Process 3, in case the Request type indicates an "existing PDU session", the SMF determines that the corresponding request is caused by a handover between the 3GPP access and the non-3GPP access. The SMF may identify the existing PDU session based on the PDU session ID.

In case the SMF has not yet searched the SN-related subscription data for the UE that is related to the DNN, the SMF may request the subscription data.

4b) The UDM may transmit a Subscription Data Response message to the SMF.

The subscription data may include an authenticated Request type, an authenticated SSC mode, and information on a default QoS profile.

The SMF may verify whether or not the UE request follows the user subscription and local policy. Alternatively, the SMF may reject the UE request via NAS SM signaling (including the related SM rejection cause), which is forwarded (or transferred) by the AMF, and then the SMF may notify to the AMF that this shall be considered as a release of the PDU session ID.

5) The SMF transmits a message to the DN through a UPF.

More specifically, in case the SMF is required to authorize/authenticate a PDU session establishment, the SMT selects a UPF and triggers the PDU.

If the PDU Session Establishment authentication/authority assignment fails, the SMF ends the PDU Session Establishment procedure and notifies the rejection to the UE.

6a) If dynamic PCC is distributed, the SMF selects a PCF.

6b) The SMF may start a PDU-CAN session establishment towards the PCF in order to obtain a default PCC rule for the PDU session. In case the Request type indicates an "existing PDU session", the PCF may start a PDU-CAN session modification instead.

7) In case the Request type of Process 3 indicates an "initial request", the SMF selects an SSC mode for the PDU session. If Process 5 is not performed, the SMF may also select a UPF. In case of Request type IPv4 or IPv6, the SMF may allocate an IP address/prefix for the PDU session.

8) In case dynamic PCC is deployed and the PDU-CAN session establishment is not yet completed, the SMF may begin (or start) PDU-CAN Session Start.

9) In case the Request type indicates an "initial request", and in case Process 5 is not performed, the SMF may use the selected UPF and start an N4 Session Establishment procedure. And, otherwise, the SMF may use the selected and start an N4 Session Modification procedure.

9a) The SMF transmits an N4 Session Establishment/Modification request message to the UPF. And, the SMF may provide packet discovery, execution, and reporting rules of packets that are to be installed in the UPF for the PDU session. In case the SMF allocates CN tunnel information, the CN tunnel information may be provided to the UPF.

9b) By transmitting an N4 Session Establishment/Modification response message, the UPF may respond. In case the CN tunnel information is allocated by the UPF, the CN tunnel information may be provided to the SMF.

10) The SMF transmits an SM response message to the AMF. The message may include a cause, N2 SM information, and N1 SM information. The N2 SM information may include a PDU session ID, a QoS profile, and CN tunnel information. The N1 SM information PDU Session Establishment Accept message. The PDU Session Establishment Accept message may include an allowed QoS rule, an SSC mode, S-NSSAI, and allocated IPv4 address.

As information that shall be forwarded to the RAN by the AMF, the N2 SM information may include the following.

CN Tunnel information: This corresponds to a core network address of an N3 tunnel corresponding to the PDU session.

QoS Profile: This is used for providing mapping between a QoS parameter and a QoS flow identifier (QFI) to the RAN.

PDU Session ID: This may be used for indicating a relation between AN resources for the UE and the PDU session to the UE via AN signaling for the UE.

Meanwhile, the N1 SM information includes a PDU Session Establishment Accept message that shall be provided to the UE by the AMF.

Multiple QoS rules may be included in the N1 SM information and the N2 SM information within the PDU Session Establishment Accept message.

The SM response message also includes information enabling the PDU session ID and AMF to determine not only which target UE to use but also which access is to be used for the UE.

11) The AMF transmits an N2 PDU Session Request message to the RAN. The message may include N2 SM information and an NAS message. The NAS message may include a PDU session ID and a PDU Session Establishment Accept message.

The AMF may transmit an NAS message including a PDU session ID and a PDU Session Establishment Accept message. Additionally, the AMF may include the N2 SM information received from the SMF in the N2 PDU Session Request message and may then transmit the message including the N2 SM information to the RAN.

12) The RAN may perform a specific signaling exchange with a UE being related to the information received from the SMF.

The RAN also allocates RAN N3 tunnel information for the PDU session.

The RAN forwards the NAS message, which is provided in Process 10. The NAS message may include a PDU session ID and N1 SM information. The N1 SM information may include a PDU Session Establishment Accept message.

The RAN transmits the NAS message to the UE only in a case where a needed RAN resource is configured and allocation of RAN tunnel information is successful.

13) The RAN transmits an N2 PDU Session Response message to the AMF. The message may include a PDU session ID, a cause, and N2 SM information. The N2 SM information may include a PDU session ID, (AN) tunnel information, and a list of allowed/rejected QoS profiles.

The RAN tunnel information may correspond to an access network address of an N3 tunnel corresponding to the PDU session.

14) The AMF may transmit an SM Request message to the SMF. The SM Request message may include N2 SM information. Herein, the AMF may forward the N2 SM information received from the RAN to the SMF.

15a) In an N4 session for the PDU session has not already been configured, the SMF may start an N4 Session Establishment procedure along with the UPF. Otherwise, the SMF may use the UPF to start an N4 Session Modification procedure. The SMF may provide AN tunnel information and CN tunnel information. The CN tunnel information shall be provided only in a case where the SMF selects the CN tunnel information in Process 8.

15b) The UPF may transmit an N4 Session Establishment/Modification Response message to the SMF.

16) The SMF may transmit an SM Response message to the AMF. When this process is ended (or completed), the AMF may forward the related event to the SMF. This occurs during a handover, in which the RAN tunnel information is modified or the AMF is re-deployed.

17) The SMF transmits information to the UE through the UPF. More specifically, in case of PDU Type IPv6, the SMF may generate an IPv6 Router Advertisement and may transmit the generated advertisement to the UE through the N4 and UPF.

18) In case the PDU Session Establishment Request is caused by a handover between the 3GPP access and the non-3GPP access, i.e., if the Request type is configured as an "existing PDU session", the SMF releases the user plane through a source access (3GPP or non-3GPP access).

19) In case the ID of the SMF is not included in Process 4b by the UDM of the DNN subscription context, the SMF may call (or page or summon) a "UDM_Register UE serving NF service" including an SMF address and DNN. The UDM may store the ID, address, and DNN of the SMF.

During the procedure, if the PDU Session Establishment is not successful, the SMF notifies this to the AMF.

<Multiple USIMs>

The 3GPP system may support a terminal (eg, ME, UE) including a plurality of USIMs registered at the same time. For example, a plurality of Universal Subscriber Identity Modules (USIMs) may be included in the same Universal Integrated Circuit Card (UICC) or included in different UICCs.

An operation of a terminal related to simultaneous handling of a plurality of USIMs may vary according to the capability of the terminal. The function of the terminal may mean, for example, a terminal capable of single Rx (reception)/single Tx (transmission), a terminal capable of dual Rx/single Tx, and a terminal capable of dual Rx/dual Tx.

Hereinafter, a terminal using a plurality of USIMs may be referred to as a MUSIM UE. Dual Rx may enable Multiple USIM UE (MUSIM UE) to simultaneously receive traffic from two networks (eg, networks corresponding to each of two USIMs included in the MISIM UE). Dual Tx may enable the MUSIM UE to transmit traffic to both networks simultaneously. A single Rx may allow a MUSIM UE to receive traffic from one network at a time. A single Tx may allow a MUSIM UE to send traffic to one network at a time.

The MUSIM UE may allow the user to set the user's preference for the same service or different services based on multiple USIMs. Multiple USIMs may be provided by the same MNO or different MNOs.

Based on the service preference set by the user, a MUSIM UE actively engaged in communication related to one USIM may determine i) whether to monitor a paging channel related to another registered USIM or ii) whether to present a mobile terminated service to the user triggered a paging request related to another registered USIM.

When USIMs of different operators are provided by different MNOs, the 3GPP system shall not restrict the use of USIMs of other operators by one operator. For reference, the 3GPP system may refer to a communication system supporting communication technologies such as LTE and 5G.

The 3GPP system must be able to securely support a MUSIM UE having a plurality of USIMs from the same MNO or different MNOs in the same UE.

In order to prevent interference between a user's service preference for one USIM and an operator's service preference for another USIM, the 3GPP system may provide an appropriate security mechanism.

Each USIM may appear as a separate device in the 3GPP system.

Mobile terminated services for a Multi-USIM device may be supported.

The 3GPP system may inform the UE of information on the type of traffic that triggered paging as part of the paging procedure. This information may be used by to determine whether a user or MUSIM should respond to a mobile terminated call while the UE is engaged in active communication based on another USIM. The granularity of paging information can distinguish the following service categories:

Internet Protocol (IP) Multimedia Subsystem (IMS) based voice service and non-IMS based voice service IMS-based Short Message Service (SMS) or Unstructured Supplementary Service Data (USSD) and non-IMS-based SMS or USSD IMS services other than voice or SMS Other services not listed above (e.g. data services including video)

The 3GPP system may postpone active communication. For example, when the UE needs to perform another USIM-related activity, the 3GPP system may postpone active communication.

The 3GPP system may resume the postponed communication. For example, if the UE completes another USIM-related activity, the 3GPP system may resume the postponed communication.

The 3GPP system should be able to minimize paging collisions for paging related to multiple USIMs in the UE.

Here, the paging collision may mean a situation in which paging occurrences related to a plurality of USIMs overlap in time. UEs operating with a single Rx must choose to monitor a single paging channel at a time, which may cause paging to other paging channels to fail.

The 3GPP system should provide a mechanism to minimize signaling overhead for services related to multiple USIMs of a MUSIM UE.

The 3GPP system should be able to minimize the influence of services related to one USIM on the services related to other USIMs of the MUSIM UE.

The 3GPP system provides a means for the MUSIM UE to receive an incoming call related to one USIM and switch over to the corresponding incoming call when MUSIM UE has a call related to another USIM is in progress. This requirement may not apply for passive mode MUSIM UEs.

The 3GPP system may enable a MUSIM UE to provide a voice service from one USIM and simultaneously provide a data service from another USIM. The 3GPP system can minimize the impact of a MUSIM UE on an ongoing data service related to one USIM while a user is simultaneously answering calls related to another USIM. This requirement may not applied to passive mode MUSIM UEs.

The 3GPP system can minimize unnecessary signaling and unnecessary use of resources for the MUSIM UE operating in the Dual SIM Dual Standby (DSDS) mode.

For each PLMN in which a MUSIM UE operating in DSDS mode is registered, postponement and resumption of a specific set of services may be possible.

<Paging Collision>

The paging collision may mean that two paging occasions to be monitored by the UE collide in the time domain. For example, when the UE uses a plurality of USIMs, when a paging occasion in a network related to one USIM collides with a paging occasion in a network related to another USIM, it can be said that a paging collision has occurred.

The UE may monitor paging frames and paging occasions. For example, in the case of E-UTRA, a paging frame and a paging occasions may be allocated based on IMSI.

A paging occasion may be defined, for example, as follows. A paging opportunity (Paging Occasion: PO) is a subframe in which a Paging Radio Network Temporary Identifier (P-RNTI) can be transmitted through the PDCCH.

One paging frame (PF) may be one radio frame (including one or multiple paging occasions). When Discontinuous Reception (DRX) is used, the UE only needs to monitor one PO per DRX cycle.

An example of overlapping paging opportunities will be described with reference to FIG. 7.

Figure 7:
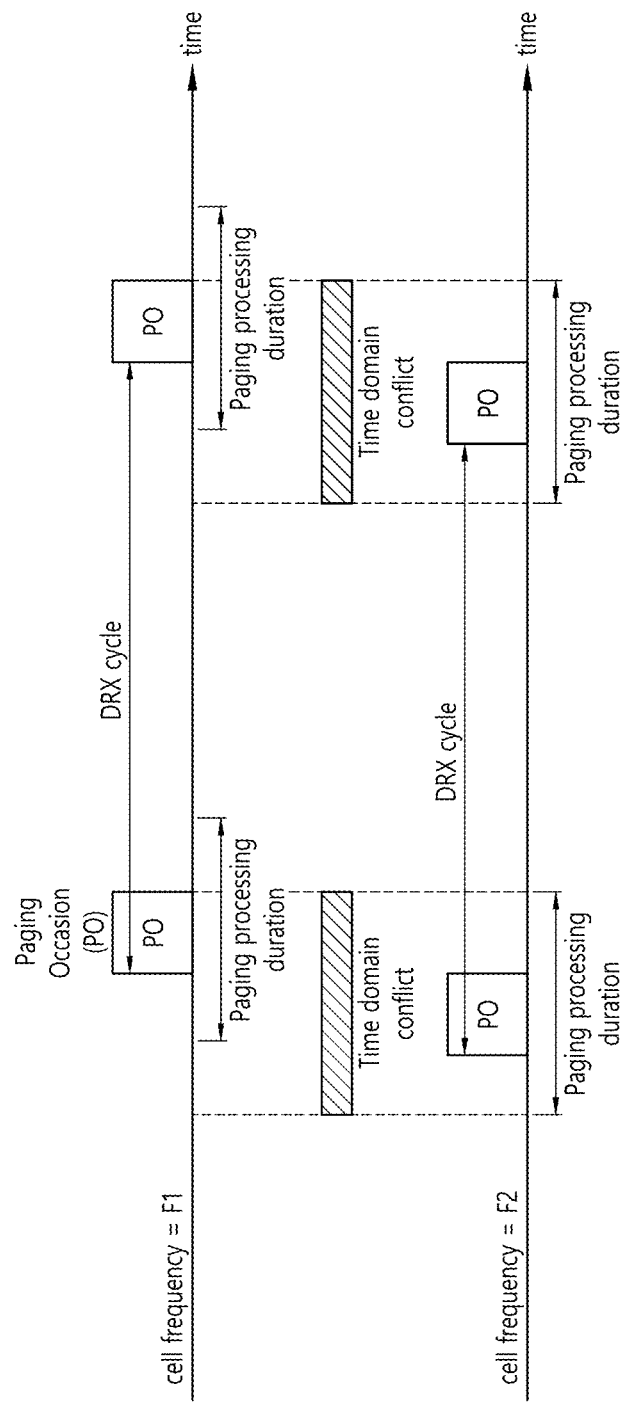
FIG. 7 is a diagram illustrating an example in which paging occasions overlap.

FIG. 7 is a diagram illustrating an example in which paging occasions overlap.

Referring to FIG. 7, the UE needs to receive services on two different frequencies (eg, F1 and F2).

For example, at frequency F1, the UE may expect to receive a paging from a first network (eg, PLMN 1). And, at frequency F2, the UE may expect to receive another communication service (eg, LTE paging, 5G paging, etc.) from the second network (eg, PLMN 2).

A UE with a single Rx chain may receive services on frequencies F1 and F2, alternating between frequencies F1 and F2.

The service at frequency F2 may be scheduled by the network for the same amount of time as the paging opportunity at frequency F1. The service at frequency F2 may have a period equal to the period of the DRX cycle at frequency F1, or may have a period that is a multiple of the period of the DRX cycle. For reference, in FIG. 7, the paging processing duration may mean a time used to process paging.

Repetitive scheduling collisions between two services may cause the UE to miss paging on frequency F1. Likewise, such a scheduling collisions may cause the UE to miss service reception (eg, paging reception) on frequency F2.

Although there is a dual subscription, a device with a single Rx chain (eg a MUSIM UE such as a dual SIM device) can register with two different networks. In both networks, the paging occasions for each subscription may occur almost simultaneously, resulting in paging collisions between subscriptions.

II. Problems to be Solved by the Disclosure of the Present Specification

In a 3GPP system (eg, 4G network, 5G network), it is basically assumed that one UE has one SIM. However, among the actually released UEs, there are UEs (eg, MUSIM UEs) supporting dual SIM or multi SIM.

In particular, in some countries, a large number of such multi-SIM UEs are released, and in some cases, they form a mainstream among UEs of the country. Since the 3GPP standard does not clearly support the operation of multi SIM UEs, these UEs are implemented in a dual standby manner to support communication based on multiple SIMs.

For example, in the dual standby method, the UE uses all of a plurality of SIMs (eg, two SIMs) to perform a registration procedure for networks related to each SIM, and then switches radios as necessary to provide networks and services.

In this method, in general, the UE is implemented so that the user sets which service to be provided through which SIM. For example, the user may set the SMS to be provided through the first SIM and the voice call to be provided through the second SIM. Therefore, the UE may switch the radio based on the user's setting.

In the case of mobile originating (MO) traffic, the UE may operate based on the user's settings as described above. However, in the case of Mobile Terminated (MT) traffic, a problem may occur.

For example, in a situation in which the UE includes two SIMs (eg, a first SIM associated with PLMN 1 and a second SIM associated with PLMN 2), the UE may register with PLMN 1 and PLMN 2 based on the respective SIMs.

In this case, the UE needs to monitor both paging of PLMN 1 and PLMN 2 in the idle state, when the paging occasion of PLMN 1 and the paging occasion of PLMN 2 overlap (overlapping), the UE may monitor only one PLMN at a time.

For this reason, in a situation where the user needs to be provided with an important service (eg, a phone call), a situation may occur in which the UE is not provided with an important service while monitoring another PLMN. For example, if data traffic for a mobile terminating service (eg, voice call) occurs in PLMN 2 while the UE is monitoring the paging opportunity of PLMN 1, the UE cannot receive the mobile terminating service of PLMN 2 may occur.

In addition to these problems, while the UE is receiving the service from PLMN 1, since the UE cannot perform paging monitoring for PLMN 2, there is a problem that the UE does not respond to paging occurring in PLMN 2. In this case, since the network node of PLMN 2 repeatedly performs paging transmission, a problem in which paging resources are wasted may occur.

In addition, when the UE continuously communicates in a connected state in one PLMN (eg, PLMN 1), the UE cannot perform a registration update in PLMN 2. Since the UE cannot perform registration update in PLMN 2, deregistration may occur or mobility registration may not be properly performed. Due to this, a problem may occur in that the location of the UE is not properly determined in the network (eg, PLMN 2).

In order to solve the above problems, it is necessary to discuss a method for efficiently supporting a UE using a plurality of SIMs.

In order to solve these problems, research is being conducted to efficiently support a UE supporting multiple USIMs in 3GPP SAE In addition, in 3GPP SA2, research is being conducted on an operation method for a UE supporting multiple USIM (MUSIM).

III. Disclosure of the Present Specification

The disclosures described below in this specification may be implemented in one or more combinations (Example: Combination including at least one of the contents described below). Each of the drawings shows an embodiment of each disclosure, but the embodiments of the drawings may be implemented in combination with each other.

For reference, in this specification, USIM may be used as an example of SIM. The description of the USIM may be equally applied to the SIM, and the description of the SIM may be equally applied to the USIM. In other words, in this specification, USIM and SIM may be used interchangeably.

The description of a method for performing communication related to a plurality of SIMs (eg, MUSIM) proposed in the disclosure of the present specification may consist of a combination of one or more operations/configurations/steps described below.

In the present specification, a method for preventing unnecessary paging from a network related to another SIM while a user using a terminal supporting a plurality of SIMs receives a service through one SIM will be described. For example, in the disclosure of this specification, a method is described in which a user can prevent unnecessary paging in the network while receiving a service through one SIM is described, by the terminal provides configuration related to a service that the user does not want (eg, a service related to another SIM that the terminal does not want to be provided while receiving the service through one SIM) to the network.

The contents described in the disclosure of the present specification are applicable to both an Evolved Packet System (EPS) and a 5G System (5GS).

As described in the disclosure of the present specification, a terminal and/or a network may perform an operation as illustrated in the following example.

For example, the terminal may transmit service information for a service requiring mobile terminating (MT) or NAS notification to the network. Thereafter, when the terminal notifies the network of leaving (that is, when the terminal notifies that the terminal will receive a service through another SIM), the network can perform MT paging or NAS notification to the terminal only for the service requested by the terminal. If the terminal notifies returning to the network (eg, when the terminal notifies that it will receive service again through the SIM related to the network), the network transmits the service (eg, service notified to the network by the terminal through service information) configured by the terminal, the network may perform MT paging or NAS notification for the terminal.

For example, the network may perform paging and/or NAS notification to the terminal when necessary (eg, when control signaling needs to be transmitted, etc.), regardless of the MT service configuration set by the terminal.

Hereinafter, a method of performing communication related to a plurality of USIMs will be described with reference to the first and second disclosures of the present specification. For example, a method of performing communication related to a plurality of USIMs through selective MT service configuration will be described. The first disclosure of the present specification describes a method of performing communication related to a plurality of USIMs using SM (Session Management) signaling, and the second disclosure of the present specification describes a method of performing communication related to a plurality of USIMs using MM (Mobility Management) signaling.

1. First Disclosure of the Present Specification

In the first disclosure of the present specification, a method of performing communication related to a plurality of USIMs using Session Management (SM) signaling will be described. For example, the first disclosure of the present specification describes a method of selectively configuring MT service using SM signaling for communication related to a plurality of USIMs.

The following drawings were created to explain a specific example of the present specification. Since the names of specific devices described in the drawings or the names of specific signals/messages/fields are presented by way of example, the technical features of the present specification are not limited to the specific names used in the following drawings.

In a first example of the first disclosure of the present specification, a method of performing selective MT service configuration in 5GS using SM signaling for communication related to a plurality of USIMs will be described.

Figure 8:
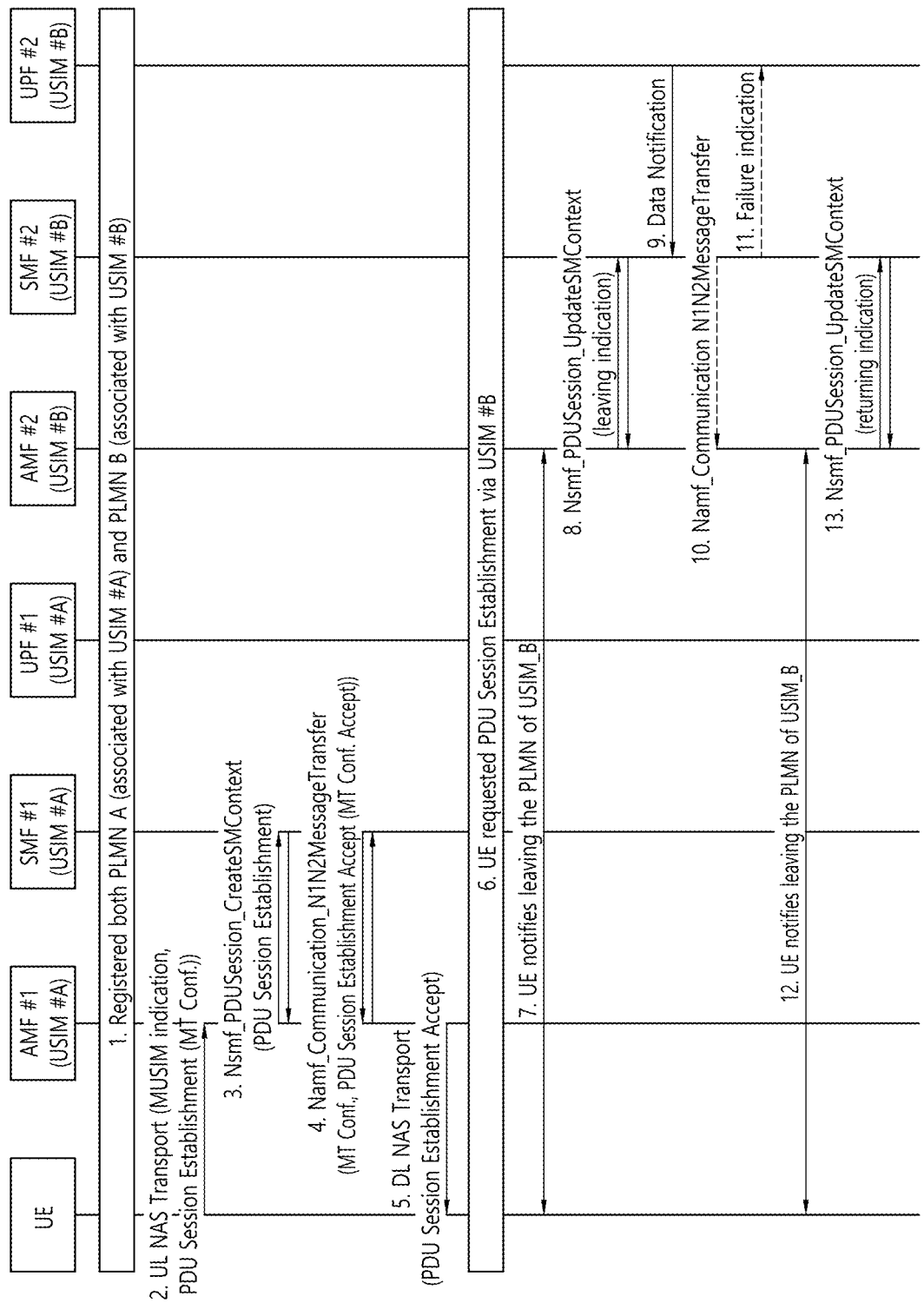
FIG. 8 shows an example of a signal flow diagram according to a first example of the first disclosure of the present specification.

FIG. 8 shows an example of a signal flow diagram according to a first example of the first disclosure of the present specification.

Referring to the example of FIG. 8, a UE supporting communication using a plurality of SIMs (eg, USIM #A and USIM #B) is illustrated. 8, network nodes related to USIM #A (eg, AMF #1, SMF #1, UPF #1) and network nodes related to USIM #B (eg, AMF #2, SMF #2, UPF) #2) is shown. For reference, the network nodes related to USIM #A (eg, AMF #1, SMF #1, UPF #1) may mean network nodes included in the PLMN related to USIM #A. Network nodes related to USIM #B (eg, AMF #2, SMF #2, UPF #2) may mean network nodes included in PLMN related to USIM #B.

1) UE (eg MUSIM UE) may register to each PLMN (eg, PLMN related to USIM #A (PLMN A) and PLMN related to USIM #B (PLMN B)) by using USIM #A and USIM #B. For example, the UE may register to each PLMN (eg, PLMN related to USIM #A (PLMN A) and PLMN related to USIM #B (PLMN B)) by performing the registration procedure described with the example of FIGS. 5*a* and 5*a*.

2) In order to establish a PDU session in PLMN A, the UE may transmit a PDU Session Establishment Request message including MT Service Configuration information. The UE may transmit a PDU session establishment request message to AMF #1.

The MT service configuration information includes a list of services (eg, IMS (IP Multimedia Subsystem) voice, other services, etc.) that the UE wants to be notified of when the UE receives a service through another USIM (eg, a USIM other than USIM #A). The name of the MT service configuration information is merely an example, and in the disclosure of this specification, the name of the MT service configuration information may be replaced with another name such as paging filtering rule information.

When the UE transmits a PDU session establishment request message, the UE may include a "MUSIM" indication (or information) in the UL NAS Transport message. For example, the "MUSIM" indication (or information) may be information indicating that the UE uses (or supports) a plurality of USIMs.

For example, the UE may transmit a UL NAS Transport message to AMF #1, where the UL NAS Transport message may include a MUSIM indication (or information) and a PDU session establishment request message including MT service configuration information. If there are multiple PDU sessions for which the UE wants to be notified, the UE may transmit a request message for each PDU session (eg, a PDU session establishment request message including MT service configuration information).

Here, the terminal (eg, UE) may transmit MT service configuration information in the form of a Traffic Flow Template (TFT), an application ID, or a standardized service category. For reference, TFT is an example of a packet filter. Through this, the UE (eg, UE) may specifically configure a service to receive MT paging. For example, while receiving a service through another USIM (eg, USIM #B), a UE (eg, UE) may specifically configure a service for receiving MT paging from PLMN A.

3) Based on the "MUSIM" indication (or information) included in the UL NAS Transport message, AMF #1 may select an SMF supporting MT service configuration information, and may trigger Nsmf_PDUSession_CreateSMContext service operation. For example, AMF #1 may select an SMF (eg, SMF #1) supporting MT service configuration information based on the "MUSIM" indication (or information) included in the UL NAS Transport message. In addition, AMF #1 may transmit a PDU session establishment request message to SMF #1 by triggering the Nsmf_PDUSession_CreateSMContext service operation.

4) SMF may accept PDU session and MT service configuration information. For example, when the SMF accepts the PDU session and MT service configuration information, the SMF may transmit a PDU session establishment accept message together with the MT Service Configuration Accepted indication (or information) to the AMF. For example, the SMF may transmit a Namf_Communication_N1N2MessageTransfer service message to the AMF. The Namf_Communication_N1N2MessageTransfer service message may include a PDU session establishment accept message including an MT Service Configuration Accepted indication (or information). In addition, the SMF may include the MT Service Configured indication (or information) in the Namf_Communication_N1N2MessageTransfer service message in order to inform the AMF that the UE has configured the selective MT service.

Here, the MT Service Configuration Accepted indication (or information) may be an indication (or information) indicating that the MT service configuration information transmitted by the UE has been accepted. For example, the MT Service Configuration Accepted indication (or information) may be included in the NAS message and transmitted to the UE. The MT Service Configured indication (or information) may be an indication (or information) for informing the AMF that the UE has configured the optional MT service. That is, the SMF may inform the AMF that the UE has configured the selective MT service using the MT Service Configured indication (or information).

5) AMF #1 may transmit a DL NAS Transport message including a PDU session establishment acceptance message to the UE. AMF #1 may transmit the PDU session establishment accept message by including the MT Service Configuration Accepted indication (or information) in the PDU session establishment accept message. Based on the MT Service Configuration Accepted indication (or information) included in the PDU session establishment accept message, the UE may know that the SMF has accepted the UE's request (eg, a PDU session establishment request and/or a request informing the UE of the service it wants to be notified of).

6) The UE may request establishment of a PDU session in PLMN B through USIM #B. For example, the UE, AMF #2, SMF #2, and UPF #2 may perform the same operations as described in steps 2) to 5) to establish a PDU session in PLMN B.

7) Via AS (Access Stratum) signaling or NAS signaling, the UE may inform a network (eg, PLMN B) of USIM #B (eg, AMF #2 and/or SMF #2) that the UE is leaving the network (eg, PLMN B).

In this process, the AMF may also inform the SMFs, that manage PDU sessions for which MT configuration is not performed, that the terminal (eg, UE) has left. Upon receiving the information that the terminal (eg, UE) has left from the AMF, the SMF may release the corresponding user plane when a current user plane is set up. That is, upon receiving the information that the terminal (eg, UE) has left from the AMF, the SMF may perform a PDU session deactivation procedure. Alternatively, the AMF may switch the terminal (eg, UE) to a CM (Connection Management)-IDLE state.

In other words, the UE (eg, UE) may transmit information indicating that the UE (eg, UE) has left to the AMF. Then, the AMF may change the UE to an IDLE (eg, CM-IDLE) state or inform the SMF that the UE (eg, UE) has left. When the AMF notifies the SMF that the terminal (eg, UE) has left, the SMF may perform release of the user plane. When the UE enters the IDLE state, the user plane of all PDU sessions the UE may be released. The AMF may switch the UE to the IDLE state to release the user plane of all PDU sessions of the UE, or the SMF may selectively release the user plane by notifying the SMF that the UE (eg, UE) has left. In step 7), an example of a situation in which the UE performs communication in PLMN B through USIM #B and performs communication in another network (eg, PLMN A) through leaving PLMN B will be described. However, this is only an example, and unlike the example of FIG. 8, the UE performs communication in PLMN A through USIM #A, and then leaves PLMN A and communicates in another network (eg, PLMN B). For reference, in this case, the UE inform USIM #A's network (eg, PLMN A) (Example: AMF #1 and/or SMF #1) that the UE leaves the network (eg, PLMN A) via AS (Access Stratum) signaling or NAS signaling.

8) AMF #2 may transmit a message including a leaving indication (or information) (eg Nsmf_PDUSession_UpdateSMContext message) to the SMF (e.g. SMF #2 that sent the MT Service Configured indication (or information) to AMF #2 in step 6). For example, AMF can transmit the leaving indication (or information) to the SMF (eg SMF #2) that transmitted the MT Service Configured indication (or information) by triggering the Nsmf_PDUSession_UpdateSMContext service operation.

9) If there is downlink data pending for the UE, UPF #2 may report to SMF #2. For example, UPF #2 may transmit a data notification (Data Notification) message to SMF #2 to report that there is pending downlink data for the UE.

10) When pending downlink data is associated with a service included in the MT service configuration information, the SMF may trigger the Namf_Communication_N2N2MessageTransfer service. For example, the SMF may notify that downlink data for the UE exists by transmitting the Namf_Communication_N2N2MessageTransfer message to AMF #2.

In this process, the SMF may additionally transmit information about which service requests the user plane setup (eg, information on the type of service) to the AMF. For example, the Namf_Communication_N2N2MessageTransfer message transmitted from SMF #2 to AMF #2 may include information on which service requests user plane setup. Here, information on which service requests user plane setup (eg, information on the type of service) is one of the services set by the terminal (eg, UE) through MT service configuration information in step 2) (eg: one of the services included in the list of services that the UE wants to be notified of). Thereafter, the AMF may include information on the service type in the paging message or NAS notification while transmitting the paging message or NAS notification to the terminal (eg, UE).

For reference, if the pending downlink data is not related to the service included in the MT service configuration information, the SMF may not trigger the Namf_Communication_N2N2MessageTransfer service even if the data notification message is received. In this case, step 11) may be performed.

11) If the pending downlink data is not related to the service included in the MT service configuration information, the SMF may notify the UPF of a User Plane setup failure. For example, in order to notify a user plane setup failure (User Plane setup failure), the SMF may transmit a failure indication (or information) to the UPF.

12) The UE may inform the network (eg, PLMN B) of USIM #B that the UE has returned to the network (eg, PLMN B) through AS signaling or NAS signaling. For example, the UE may trigger a service request procedure to inform the USIM #B's network (eg, AMF #2 and/or SMF #2) that the UE has returned to the network.

13) AMF may transmit a message (eg, Nsmf_PDUSession_UpdateSMContext message) including a returning indication (or information) from SMF (SMF (eg, SMF #2) that has sent an MT Service Configured indication (or information) to AMF #2 in step 6). For example, AMF may trigger the Nsmf_PDUSession_UpdateSMContext service action, the AMF may transmit the returning indication (or information) to the SMF (the SMF (eg SMF #2) that sent the MT Service Configured indication (or information) to AMF #2 in step 6). Here, the returning indication (or information) may be an indication (or information) indicating that the UE has returned to the network (eg, PLMN B).

After the SMF receives the returning indication (or information), the UPF may inform the SMF that there is pending downlink data for the UE. In this case, the SMF may not check whether the MT service related to the pending downlink data is related to the service included in the MT service configuration information. In other words, the SMF may inform the AMF #2 that downlink data for the UE exists by transmitting the Namf_Communication_N2N2MessageTransfer message to the AMF #2 without checking whether the MT service related to the pending downlink data is related to the service included in the MT service configuration information, based on receiving the returning indication (or information).

In a second example of the first disclosure of the present specification, for communication related to a plurality of USIMs, a method of performing selective MT service configuration in EPS using SM signaling will be described.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 9:
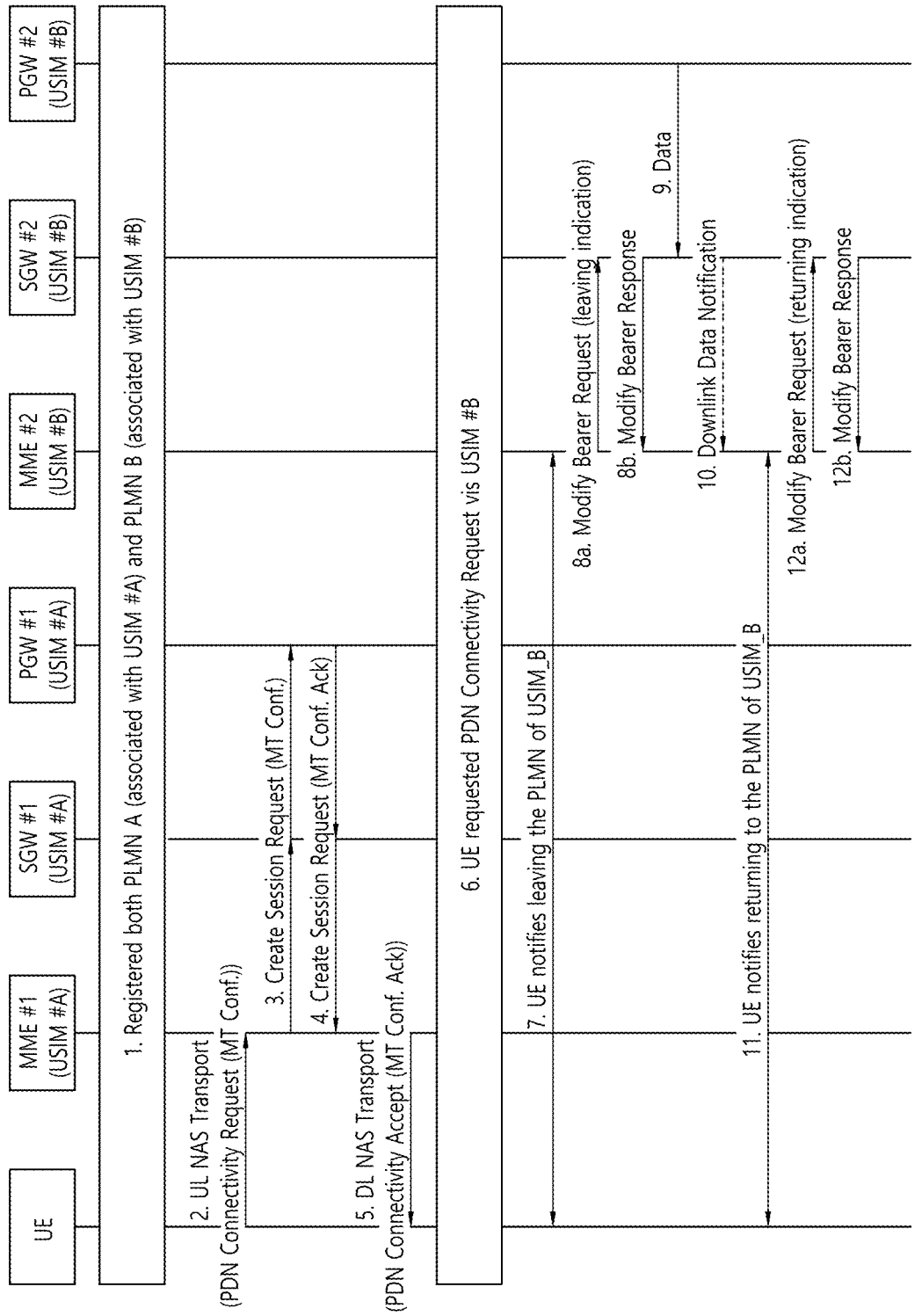
FIG. 9 shows an example of a signal flow diagram according to a second example of the first disclosure of the present specification.

FIG. 9 shows an example of a signal flow diagram according to a second example of the first disclosure of the present specification.

Referring to the example of FIG. 9, a UE supporting communication using a plurality of SIMs (eg, USIM #A and USIM #B) is illustrated. Also, in FIG. 8, network nodes (eg, MME #1, Serving Gateway (SGW) #1, Packet Data Network (PGW) Gateway) #1) related to USIM #A and network nodes (eg, MME #2, SGW #2, PGW #2) related to USIM #B are shown. For reference, network nodes related to USIM #A (eg, MME #1, SGW #1, PGW #1) may mean network nodes included in PLMN related to USIM #A. Network nodes related to USIM #B (eg, ME #2, SGW #2, PGW #2) may refer to network nodes included in PLMN related to USIM #B.

1) UE (eg MUSIM UE) may register to each PLMN (eg, PLMN related to USIM #A (PLMN A) and PLMN related to USIM #B (PLMN B)) by using USIM #A and USIM #B. For example, the UE may register to each PLMN (eg, PLMN related to USIM #A (PLMN A) and PLMN related to USIM #B (PLMN B)) by performing the registration procedure described with the example of FIGS. 5a and 5a.

2) In order to establish a PDN connection in PLMN A, the UE may transmit a PDN Connectivity Request message including MT Service Configuration information. The UE may transmit a PDN connection request message to MME #1.

The MT service configuration information includes a list of services (eg, IMS (IP Multimedia Subsystem) voice, other services, etc.) that the UE wants to be notified of when the UE receives a service through another USIM (eg, a USIM other than USIM #A).

When the UE transmits a PDN Connectivity Request message, the UE may include a "MUSIM" indication (or information) in the UL NAS Transport message. For example, the "MUSIM" indication (or information) may be information indicating that the UE uses (or supports) a plurality of USIMs.

For example, the UE may transmit a UL NAS Transport message to MME #1, where the UL NAS Transport message may include a MUSIM indication (or information) and a PDN connection request message including MT service configuration information. If there are multiple PDN connection for which the UE wants to be notified, the UE may transmit a request message for each PDN connection (eg, a PDN connection request message including MT service configuration information).

Here, the terminal (eg, UE) may transmit MT service configuration information in the form of a TFT, an application ID, or a standardized service category. Through this, the UE (eg, UE) may specifically configure a service to receive MT paging. For example, while receiving a service through another USIM (eg, USIM #B), a UE (eg, UE) may specifically configure a service for receiving MT paging from PLMN A.

For reference, the UE (eg, UE) may transmit an SM message such as a bearer resource modification request message (eg, Request Bearer Resource Modification message) in addition to the PDN connection request message. Alternatively, the UE (eg, UE) may transmit MT service configuration information for all PDN connections at once through a tracking area update (TAU).

3) MME #1 may transmit a Create Bearer Request message to PGW #1 via SGW #1. For example, MME #1 may transmit a Create Bearer Request message including MT service configuration information received from the UE to SGW #1, and SGW #1 may transmit a Create Bearer Request message to PGW #1.

If the UE (eg, UE) does not transmit a PDN connection request message and transmits another message (eg, Request Bearer Resource Modification message, TAU, etc.), MME #1 may transmit a Modify Bearer Request message rather than a Create Bearer Request message.

4) The SGW may accept the MT service configuration information. When the SGW accepts the MT service configuration information, the SGW may transmit an MT Service Configuration Accepted (or Accept) indication (or information) to the MME.

For reference, in step 4) of the example of FIG. 8, the SMF transmits the MT Service Configured indication (or information) to the AMF, but the SGW does not transmit the MT Service Configured indication (or information). This is because, in 5GS, the AMF cannot read the NAS message of the SMF because the SMF directly generates the NAS message and transmits it to the terminal. For this reason, in step 4) of the example of FIG. 8, the SMF may separately transmit an MT Service Configured indication (or information) to the AMF. On the other hand, in EPS, only the MME can generate a NAS message. For this reason, when the SGW and/or PGW sends an MT Service Configuration Accepted (or Accept) indication (or information) to the MME through the Create Session Response message, the MME may generate a NAS message based on the MT Service Configuration Accepted (or Accept) indication (or information). Therefore, unlike step 4) of the example of FIG. 8, in step 4) of the example of FIG. 9, through one indication (eg, MT Service Configuration Accepted (or Accept) indication (or information)), the PGW may inform the MME that the MT service configuration information has been accepted.

5) Based on the MT Service Configuration Accepted (or Accept) indication (or information), the MME may transmit a PDN connection acceptance message including the MT Service Configuration Accepted (or Accept) indication (or information) to the UE. Based on the MT Service Configuration Accepted (or Accept) indication (or information) included in the PDN connection acceptance message, the UE indicates that the network informs the network of the UE's request (eg, PDN connection request and/or service for which the UE wants to be notified). request) has been accepted.

If the UE (eg, UE) does not transmit a PDN connection request message and transmits another message (eg, Request Bearer Resource Modification message, TAU, etc.), MME #1 may transmit message, such as a TAU accept message, a Modify EPS Bearer Context Request message other than a PDN connection accept message.

6) The UE may request establishment of a PDN connection in PLMN B through USIM #B. For example, the UE, MME #2, SGW #2, and PGW #2 may perform the same operations as described in steps 2) to 5) to establish a PDN connection in PLMN B.

7) The UE may inform the network (eg, PLMN B) of USIM #B that the UE leaves the network (eg, PLMN B) through AS (Access Stratum) signaling or NAS signaling.

In this process, when the UE (eg, UE) leaves, the MME may switch the UE (eg, UE) to the CM-IDLE state.

8) The MME may transmit a Modify Bearer Request message including the leaving indication (or information) to the SGW. The leaving indication (or information) may be an indication (or information) to inform that the UE has left the network (eg, PLMN B). Upon receiving the Modify Bearer Request message, the SGW may transmit a Modify Bearer Response message to the PGW.

9) If there is downlink data pending for the UE, the PGW may transmit the data to the SGW.

10) When the pending downlink data is associated with a service included in the MT service configuration information, the SGW may transmit a Downlink Data Notification message to the MME.

In this process, the SGW may additionally add information (eg, service type information) on which service requests the user plane setup and transmit it to the MME. Here, information on which service requests the user plane setup (eg, information on the type of service) is one of the services set by the terminal (eg, UE) through MT service configuration information in step 2) (eg: one of the services included in the list of services that the UE wants to be notified of). Thereafter, the MME may include information on the service type in the paging message or NAS notification while transmitting the paging message or NAS notification to the terminal (eg, UE).

For reference, when the pending downlink data is not related to the service included in the MT service configuration information, the SGW may drop a packet related to a pending downlink data related.

11) The UE may inform the network (eg, PLMN B) of USIM #B that the UE has returned to the network (eg, PLMN B) through AS signaling or NAS signaling. For example, the UE may trigger a service request procedure to inform the network of USIM #B that the UE has returned to the network.

12) The MME may transmit a Modify Bearer Request message including the returning indication (or information) to the SGW. The MME may inform that the UE has returned to the network (eg, PLMN B), by transmitting a returning indication (or information) to the SGW.

2. Second Disclosure of the Present Specification

In the second disclosure of the present specification, a method of performing communication related to a plurality of USIMs using MM signaling will be described. For example, the second disclosure of the present specification describes a method of performing selective MT service configuration using MM signaling for communication related to a plurality of USIMs.

A first example of the second disclosure of the present specification describes a method of performing selective MT service configuration in 5GS using MM signaling for communication related to a plurality of USIMs.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 10:
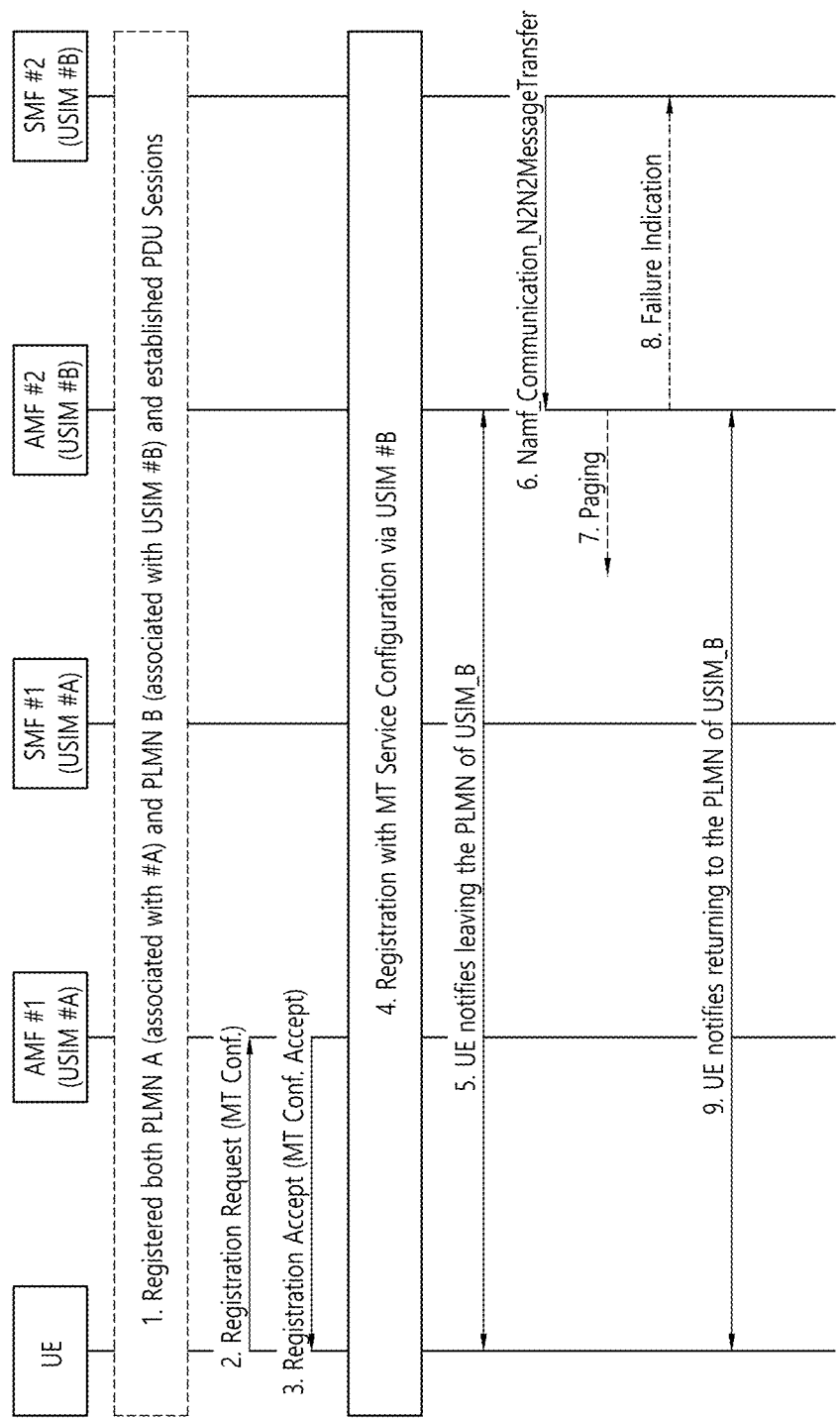
FIG. 10 shows an example of a signal flow diagram according to a first example of the second disclosure of the present specification.

FIG. 10 shows an example of a signal flow diagram according to a first example of the second disclosure of the present specification.

Referring to the example of FIG. 10, a UE supporting communication using a plurality of SIMs (eg, USIM #A and USIM #B) is illustrated. In addition, in FIG. 10, network nodes (eg, AMF #1, SMF #1, UPF #1) related to USIM #A and network nodes (eg, AMF #2, SMF #2, UPF #2) related to USIM #B are shown. For reference, the network nodes related to USIM #A (eg, AMF #1, SMF #1, UPF #1) may mean network nodes included in the PLMN related to USIM #A. Network nodes related to USIM #B (eg, AMF #2, SMF #2, UPF #2) may mean network nodes included in PLMN related to USIM #B. For reference, UPF #1 and UPF #2 are omitted in the example of FIG. 10.

1) UE (eg MUSIM UE) may register to each PLMN (eg, PLMN related to USIM #A (PLMN A) and PLMN related to USIM #B (PLMN B)), and may establish PDU session, by using USIM #A and USIM #B. For example, the UE may register to each PLMN (eg, PLMN related to USIM #A (PLMN A) and PLMN related to USIM #B (PLMN B)) by performing the registration procedure described with the example of FIGS. 5a and 5a.

2) The UE may transmit a registration request message including MT Service Configuration information to AMF #1 in PLMN A.

The MT service configuration information may includes a list of services (eg, IMS (IP Multimedia Subsystem) voice, other services, etc.).) that the UE wants to be notified of when the UE receives a service through another USIM (eg, a USIM other than USIM #A).

For reference, the "MUSIM" indication (or information) is used in step 2) of the example of FIG. 8, but since the MM message is used in the example of FIG. 9, the "MUSIM" indication (or information) may not be transmitted. Specifically, since the MME can read the MM message, when the UE transmits a registration request message including MT Service Configuration information, MME #1 can read the registration request message, so that the MME #1 may know that the UE uses (or supports) multiple USIMs. In other words, in step 2) of the example of FIG. 8, since the AMF cannot read the SM message (eg, the PDU session establishment request message), by using the "MUSIM" indication (or information), the UE may inform the AMF that the UE uses uses (or supports) a plurality of USIMs (or that the corresponding SM message is for MUSIM-related operation). On the other hand, in step 2) of the example of FIG. 9, even if there is no "MUSIM" indication (or information), since the MME can read the MM message, the MME checks the MT service configuration information, so that the MME may know that the UE uses (or supports) USIM (or that the corresponding SM message is for MUSIM-related operation).

3) When the AMF accepts the MT service configuration information, the AMF may transmit a registration accept message together with the MT Service Configuration Accepted indication (or information) to the UE. For example, the AMF may transmit a registration acceptance message including the MT Service Configuration Accepted indication (or information) to the UE. Here, the MT Service Configuration Accepted indication (or information) may be an indication (or information) indicating that the MT service configuration information transmitted by the UE has been accepted.

4) The UE may perform a registration procedure with MT service configuration, and establish a PDU session in PLMN B through USIM #B. For example, the UE, AMF #2, and SMF #2 may perform the same operations as described in steps 2) to 3) in PLMN B.

5) The UE may inform the network (eg, PLMN B) of USIM #B that the UE leaves the network (eg, PLMN B). For example, the UE may transmit information indicating that the UE leaves the network (eg, PLMN B) to AMF #2.

In this process, the AMF may also inform the SMFs managing PDU sessions for which MT configuration is not performed that the terminal (eg, UE) has left. Upon receiving the information that the terminal (eg, UE) has left from the AMF, the SMF may release the corresponding user plane when a current user plane is set up. That is, upon receiving the information that the terminal (eg, UE) has left from the AMF, the SMF may perform a PDU session deactivation procedure. Alternatively, the AMF may switch the terminal (eg, UE) to a CM (Connection Management)-IDLE state.

6) If there is downlink data pending for the UE, the SMF may transmit a Namf_Communication_N2N2MessageTransfer message to AMF #2. For example, if there is downlink data pending for the UE, UPF #2 (not shown) may report to SMF #2. Then, SMF #2 may notify that downlink data for the UE exists by transmitting a Namf_Communication_N2N2Message Transfer message to AMF #2.

7) Based on the information provided by the SMF (eg, information provided by SMF #2 through the Namf_Communication_N2N2MessageTransfer message), AMF may know what kind (eg, IMS Voice service) of service the MT service related to downlink data is. For example, the information provided by the SMF may include a Paging Policy Indicator (PPI), an Allocation and Retention Priority (ARP), and/or a 5G Quality of Service (QoS) Indentifier (5QI) value. When the pending (pending) downlink data is associated with a service included in the MT service configuration information, the AMF may transmit a paging message to the RAN. Then, the RAN may send a paging message to the UE.

8) If the pending downlink data is not related to the service included in the MT service configuration information, the AMF may transmit a failure indication (or information) to the SMF.

9) The UE may inform the network (eg, PLMN B) of USIM #B that the UE has returned to the network (eg, PLMN B) through AS signaling or NAS signaling. For example, the UE may trigger a service request procedure to inform the network of USIM #B that the UE has returned to the network.

In a second example of the second disclosure of the present specification, a method of performing selective MT service configuration in EPS using MM signaling for communication related to a plurality of USIMs will be described.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 11:
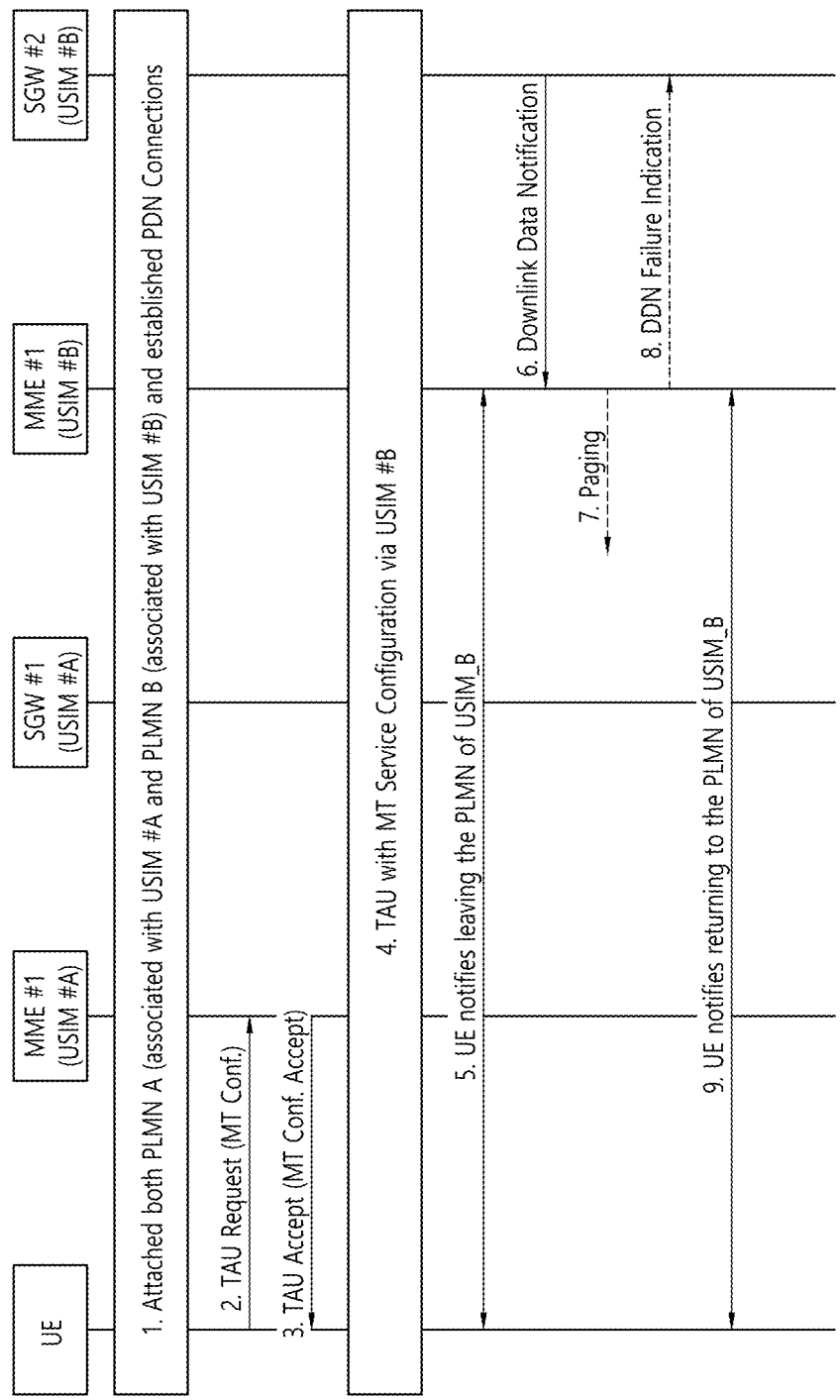
FIG. 11 shows an example of a signal flow diagram according to a second example of the second disclosure of the present specification.

FIG. 11 shows an example of a signal flow diagram according to a second example of the second disclosure of the present specification.

Referring to the example of FIG. 11, a UE supporting communication using a plurality of SIMs (eg, USIM #A and USIM #B) is illustrated. In addition, in FIG. 10, network nodes related to USIM #A (eg, MME #1, SGW #1, PGW #1) and network nodes related to USIM #B (eg, MME #2, SGW #2, PGW #2) is shown. For reference, network nodes (eg, MME #1, SGW #1, PGW #1) related to USIM #A may mean network nodes included in PLMN related to USIM #A. Network nodes (eg, MME #2, SGW #2, and PGW #2) related to USIM #B may refer to network nodes included in PLMN related to USIM #B. For reference, PGW #1 and PGW #2 are omitted in the example of FIG. 11.

1) UE (eg MUSIM UE) may register to each PLMN (eg, PLMN related to USIM #A (PLMN A) and PLMN related to USIM #B (PLMN B)), and may establish a PDN connection, by using USIM #A and USIM #B. For example, the UE may perform an attach procedure to register with each PLMN (eg, a PLMN related to USIM #A (PLMN A) and a PLMN related to USIM #B (PLMN B)).

2) The UE may transmit a TAU request message including MT Service Configuration information to MME #1 in PLMN A.

The MT service configuration information includes a list of services (eg, IMS (IP Multimedia Subsystem) voice, other services, etc.) that the UE wants to be notified of when the UE receives a service through another USIM (eg, a USIM other than USIM #A).

3) When the MME accepts the MT service configuration information, the MME may transmit a TAU acceptance message to the UE together with the MT Service Configuration Accepted indication (or information). For example, the MME may transmit a TAU accept message including an MT Service Configuration Accepted indication (or information) to the UE. Here, the MT Service Configuration Accepted indication (or information) may be an indication (or information) indicating that the MT service configuration information transmitted by the UE has been accepted.

4) The UE may perform an attach procedure with MT service configuration, and establish a PDN connection in PLMN B through USIM #B. For example, the UE, MME #2, and SGW #2 may perform the same operations as described in steps 2) to 3) in PLMN B.

5) The UE may inform the network (eg, PLMN B) of USIM #B that the UE leaves the network (eg, PLMN B). For example, the UE may transmit information indicating that the UE leaves the network (eg, PLMN B) to the MME #2.

In this process, when the UE (eg, UE) leaves, the MME #2 may switch the AMF to the UE (eg, UE) into a CM (Connection Management)-IDLE state.

6) If there is downlink data pending for the UE, SGW #2 may transmit a Downlink Data Notification (DDN) message to MME #2. For example, if there is downlink data pending for the UE, PGW #2 (not shown) may transmit data to SGW #2. Then, SGW #2 may notify that downlink data for the UE exists by transmitting a Downlink Data Notification (DDN) message to the MME #2.

7) When the pending downlink data is associated with a service included in the MT service configuration information, the MME may transmit a paging message to the RAN. Then, the RAN may send a paging message to the UE.

8) When the pending downlink data is not related to the service included in the MT service configuration information, the MME may transmit a failure indication (eg, a DDN Failure indication) to the SGW.

9) The UE may inform the network (eg, PLMN B) of USIM #B that the UE has returned to the network (eg, PLMN B) through AS signaling or NAS signaling. For example, the UE may trigger a service request procedure to inform the network of USIM #B that the UE has returned to the network.

As described in the disclosure of this specification, a terminal (eg, UE) may transmit MT service configuration information to a network. While a terminal (eg, UE) is receiving service through one SIM (eg, USIM #B), by notifying that it is leaving a network related to another SIM (eg, USIM #A), while the terminal (eg, UE) performs communication on a network (eg PLMN A) related to another SIM (eg USIM #A), the network (eg PLMN B) may perform paging/NAS notification for a preconfigured service (eg, a service configured according to MT service setting information). When a UE (eg, UE) stops receiving service through a specific SIM (eg USIM #A), by notifying to a network (eg, PLMN B) related to another SIM (eg, USIM #B) that this the UE is returning to the corresponding network (eg PLMN B), the network (eg PLMN B) may perform paging/NAS notification for all services regardless of pre-configured services (eg, services configured according to MT service configuration information).

As described in the disclosure of the present specification, if a terminal (eg, UE) has multiple SIMs (eg, USIM #A and USIM #B), When a terminal (eg, UE) receives a service through one SIM (eg USIM #A), if there is an MT service in another SIM (eg USIM #B), the terminal (e.g. UE) may configure a service to receive paging/NAS notification. Through this, network resources can be efficiently used by reducing unnecessary paging/signaling.

For reference, the operation of the terminal (eg, UE) described in this specification may be implemented by the apparatus of FIGS. 12 to 16 to be described below. For example, the terminal (eg, UE) may be the first device 100a or the second device 100b of FIG. 13. For example, an operation of a terminal (eg, UE) described herein may be processed by one or more processors 1020a or 1020b. The operation of the terminal described in this specification may be stored in one or more memories 1010a or 1010b in the form of an instruction/program (e.g. instruction, executable code) executable by one or more processors 1020a or 1020b. One or more processors 1020a or 1020b control one or more memories 1010a or 1010b and one or more transceivers 1031a or 1031b, and execute instructions/programs stored in one or more memories 1010a or 1010b as disclosed herein, thereby perform the operation of the terminal (eg, UE) described in the disclosure of the present specification.

In addition, instructions for performing an operation of a terminal (eg, a UE) described in the disclosure of the present specification may be stored in a non-volatile computer-readable storage medium in which it is recorded. The storage medium may be included in one or more memories 1010a or 1010b. And, the instructions recorded in the storage medium may be executed by one or more processors 1020a or 1020b to perform the operation of the terminal (eg, a UE) described in the disclosure of the present specification.

For reference, the operation of a network node (eg, SMF #1, AMF #1, UPF #1, SMF #2, AMF #2, UPF #2, MME #1, SGW #1, PGW #1, MME #2, SGW #2, PGW #2, etc.) or a base station (eg, NG-RAN, gNB, eNB, RAN, etc.) described in this specification will be may be implemented by the apparatus described below in FIGS. 12 to 16. For example, the network node (eg, SMF #1, AMF #1, UPF #1, SMF #2, AMF #2, UPF #2, MME #1, SGW #1, PGW #1, MME #2, SGW #2, PGW #2, etc.) or a base station (eg, NG-RAN, gNB, eNB, RAN, etc.) may be the first device 100a or the second device 100b of FIG. 13. For example, the operation of the network node (eg, SMF #1, AMF #1, UPF #1, SMF #2, AMF #2, UPF #2, MME #1, SGW #1, PGW #1, MME #2, SGW #2, PGW #2, etc.) described herein may be processed by one or more processors 1020a or 1020b. The operations of the network node or base station described herein may be stored in one or more memories 1010a or 1010b in the form of instructions/programs (e.g. instruction, executable code) executable by one or more processors 1020a or 1020b. One or more processors 1020a or 1020b control one or more memories 1010a or 1010b and one or more transceivers 1031a or 1031b, and may perform the operation of the network node (eg, SMF #1, AMF #1, UPF #1, SMF #2, AMF #2, UPF #2, MME #1, SGW #1, PGW #1, MME #2, SGW #2, PGW #2, etc.) or the base station (eg, NG-RAN, gNB, eNB, RAN, etc.) described in the disclosure of the present specification by executing instructions/programs stored in one or more memories 1010a or 1010b as disclosed herein.

In addition, the instructions for performing the operation of the network nodes described in the disclosure of this specification (eg, SMF #1, AMF #1, UPF #1, SMF #2, AMF #2, UPF #2, MME #1, SGW #1, PGW #1, MME #2, SGW #2, PGW #2, etc.) or a base station (eg, NG-RAN, gNB, eNB, RAN, etc.) may be stored in a non-volatile computer-readable storage medium recording. The storage medium may be included in one or more memories 1010a or 1010b. And, the instructions recorded in the storage medium are executed by one or more processors 1020a or 1020b to perform operations of the network node (eg, SMF #1, AMF #1, UPF #1, SMF #2, AMF #2, UPF #2, MME #1, SGW #1, PGW #1, MME #2, SGW #2, PGW #2, etc.) or base station (eg NG-RAN, gNB, eNB, RAN, etc.) described in the disclosure of the present specification.

IV. Examples to which the Disclosure of the Present Specification Applies

Although not limited thereto, the various descriptions, functions, procedures, suggestions, methods, and/or operational flowcharts of the disclosure of the present specification disclosed in this document may be applied in various fields requiring wireless communication/connection (eg, 5G) between devices.

Hereinafter, it will be exemplified in more detail with reference to the drawings. In the following drawings/descriptions, the same reference numerals may represent the same or corresponding hardware blocks, software blocks, or functional blocks, unless otherwise indicated.

Figure 12:
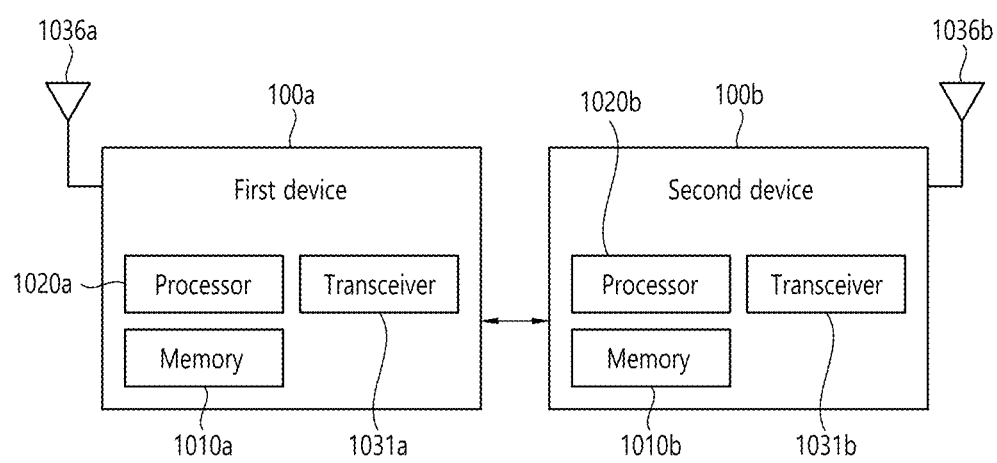
FIG. 12 illustrates a wireless communication system according to an embodiment.

FIG. 12 illustrates a wireless communication system according to an embodiment.

Referring to FIG. 12, the wireless communication system may include a first device 100a and a second device 100b. The first device 100a and the second device 100b may be wireless communication devices capable of performing wireless communication.

The first device 100a may be a UE described in the disclosure of the present specification. Or, the first device 100a may be a base station, a network node (e.g. SMF #1, AMF #1, UPF #1, SMF #2, AMF #2, UPF #2, MME #1, SGW #1, PGW #1, MME #2, SGW #2, PGW #2, etc), a transmission UE, a reception UE, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

The second device 100b may be a network node (e.g. SMF #1, AMF #1, UPF #1, SMF #2, AMF #2, UPF #2, MME #1, SGW #1, PGW #1, MME #2, SGW #2, PGW #2, etc,) described in the disclosure of the present specification. Or, the second device 100b may be a base station, a network node, a transmission UE, a reception UE, a wireless device, a wireless communication device, a vehicle, a vehicle on which a self-driving function is mounted, a connected car, a drone (Unmanned Aerial Vehicle (UAV)), an Artificial Intelligence (AI) module, a robot, an Augmented Reality (AR) device, a Virtual Reality (VR) device, a Mixed Reality (MR) device, a hologram device, a public safety device, an MTC device, an IoT device, a medical device, a FinTech device (or financial device), a security device, a climate/environment device, a device related to 5G service or a device related to the fourth industrial revolution field.

For example, the UE may include a cellular phone, a smart phone, a laptop computer, a terminal for digital broadcasting, a Personal Digital Assistants (PDA), a Portable Multimedia Player (PMP), a navigation, a slate PC, a tablet PC, an ultrabook, a wearable device (e.g., a watch type terminal (smartwatch), a glass type terminal (smart glass), a Head Mounted Display (HMD)), and so on. For example, the HMD may be a display device of a form, which is worn on the head. For example, the HMD may be used to implement VR, AR or MR.

For example, the drone may be a flight vehicle that flies by a wireless control signal without a person being on the flight vehicle. For example, the VR device may include a device implementing the object or background of a virtual world. For example, the AR device may include a device implementing the object or background of a virtual world by connecting it to the object or background of the real world. For example, the MR device may include a device implementing the object or background of a virtual world by merging it with the object or background of the real world. For example, the hologram device may include a device implementing a 360-degree stereographic image by recording and playing back stereographic information using the interference phenomenon of a light beam generated when two lasers called holography are met. For example, the public safety device may include a video relay device or an imaging device capable of being worn on a user's body. For example, the MTC device and the IoT device may be a device that does not require a person's direct intervention or manipulation. For example, the MTC device and the IoT device may include a smart meter, a vending machine, a thermometer, a smart bulb, a door lock or a variety of sensors. For example, the medical device may be a device used for the purpose of diagnosing, treating, reducing, handling or preventing a disease. For example, the medical device may be a device used for the purpose of diagnosing, treating, reducing or correcting an injury or obstacle. For example, the medical device may be a device used for the purpose of testing, substituting or modifying a structure or function. For example, the medical device may be a device used for the purpose of controlling pregnancy. For example, the medical device may include a device for medical treatment, a device for operation, a device for (external) diagnosis, a hearing aid or a device for a surgical procedure. For example, the security device may be a device installed to prevent a possible danger and to maintain safety. For example, the security device may be a camera, CCTV, a recorder or a blackbox. For example, the FinTech device may be a device capable of providing financial services, such as mobile payment. For example, the FinTech device may include a payment device or Point of Sales (PoS). For example, the climate/environment device may include a device for monitoring or predicting the climate/environment.

The first device 100*a* may include at least one processor such as a processor 1020*a*, at least one memory such as memory 1010*a*, and at least one transceiver such as a transceiver 1031*a*. The processor 1020*a* may perform the above-described functions, procedures, and/or methods. The processor 1020*a* may perform one or more protocols. For example, the processor 1020*a* may perform one or more layers of a radio interface protocol. The memory 1010*a* is connected to the processor 1020*a*, and may store various forms of information and/or instructions. The transceiver 1031*a* is connected to the processor 1020*a*, and may be controlled to transmit and receive radio signals.

The second device 100*b* may include at least one processor such as a processor 1020*b*, at least one memory device such as memory 1010*b*, and at least one transceiver such as a transceiver 1031*b*. The processor 1020*b* may perform the above-described functions, procedures and/or methods. The processor 1020*b* may implement one or more protocols. For example, the processor 1020*b* may implement one or more layers of a radio interface protocol. The memory 1010*b* is connected to the processor 1020*b*, and may store various forms of information and/or instructions. The transceiver 1031*b* is connected to the processor 1020*b* and may be controlled transmit and receive radio signals.

The memory 1010*a* and/or the memory 1010*b* may be connected inside or outside the processor 1020*a* and/or the processor 1020*b*, respectively, and may be connected to another processor through various technologies, such as a wired or wireless connection.

The first device 100*a* and/or the second device 100*b* may have one or more antennas. For example, an antenna 1036*a* and/or an antenna 1036*b* may be configured to transmit and receive radio signals.

Figure 13:
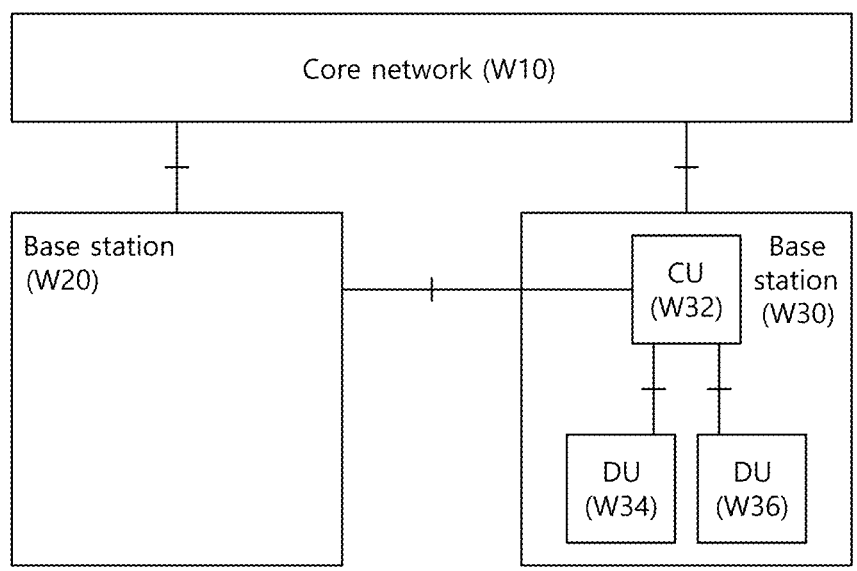
FIG. 13 illustrates a block diagram of a network node according to an embodiment.

FIG. 13 illustrates a block diagram of a network node according to an embodiment.

In particular, FIG. 13 is a diagram illustrating in detail a case in which a base station is divided into a Central Unit (CU) and a Distributed Unit (DU).

Referring to FIG. 13, base stations W20 and W30 may be connected to a core network W10. The base station W30 may be connected to a neighbor base station W20. For example, an interface between the base stations W20 and W30 and the core network W10 may be referred to as an NG. An interface between the base station W30 and the neighbor base station W20 may be referred to as an Xn.

The base station W30 may be divided into a CU W32 and DUs W34 and W36. That is, the base station W30 may be hierarchically divided and operated. The CU W32 may be connected to one or more DUs W34 and W36. For example, an interface between the CU W32 and the DU W34, W36 may be referred to as an F1. The CU W32 may perform a function of higher layers of the base station. The DU W34, W36 may perform a function of lower layers of the base station. For example, the CU W32 may be a logical node that hosts Radio Resource Control (RRC), Service Data Adaptation Protocol (SDAP) and Packet Data Convergence Protocol (PDCP) layers of the base station (e.g., gNB). The DU W34, W36 may be a logical node that hosts Radio Link Control (RLC), Media Access Control (MAC) and physical (PHY) layers of the base station. Alternatively, the CU W32 may be a logical node that hosts RRC and PDCP layer of a base station (e.g., en-gNB).

An operation of the DU W34, W36 may be partially controlled by the CU W32. The one DU W34, W36 may support one or more cells. One cell may be supported by only the one DU W34, W36. The one DU W34, W36 may be connected to the one CU W32, and the one DU W34, W36 may be connected to a plurality of CUs by a proper implementation.

Figure 14:
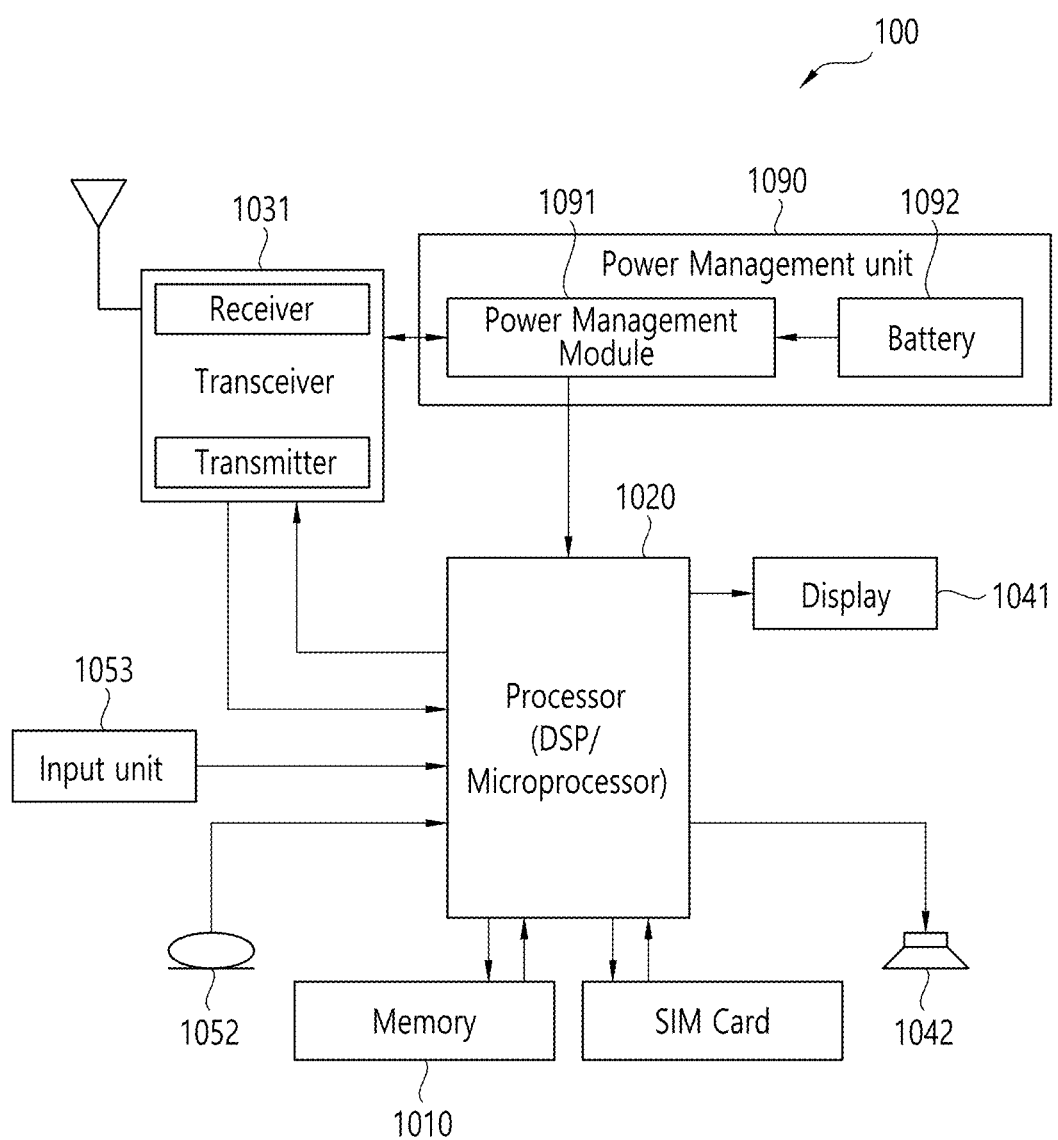
FIG. 14 is a block diagram illustrating a configuration of a UE according to an embodiment.

FIG. 14 is a block diagram illustrating a configuration of a UE according to an embodiment.

In particular, the UE 100 shown in FIG. 14 is a diagram illustrating the first device of FIG. 12 in more detail.

A UE includes a memory 1010, a processor 1020, a transceiver 1031, a power management module 1091, a battery 1092, a display 1041, an input unit 1053, a speaker 1042, a microphone 1052, a Subscriber Identification Module (SIM) card, and one or more antennas.

The processor 1020 may be configured to implement the proposed function, process and/or method described in the present disclosure. Layers of a wireless interface protocol may be implemented in the processor 1020. The processor 1020 may include Application-Specific Integrated Circuit (ASIC), other chipset, logical circuit and/or data processing apparatus. The processor 1020 may be an Application Processor (AP). The processor 1020 may include at least one of a Digital Signal Processor (DSP), a Central Processing Unit (CPU), a Graphics Processing Unit (GPU) and a Modulator and Demodulator (Modem). An example of the processor 1020 may be SNAPDRAGON™ series processor manufactured by Qualcomm®, EXYNOS™ series processor manufactured by Samsung®, A series processor manufactured by Apple®, HELIO™ series processor manufactured by MediaTek®, ATOM™ series processor manufactured by INTEL®, or the corresponding next generation processor.

The power management module 1091 manages a power for the processor 1020 and/or the transceiver 1031. The battery 1092 supplies power to the power management module 1091. The display 1041 outputs the result processed by the processor 1020. The input unit 1053 receives an input to be used by the processor 1020. The input unit 1053 may be displayed on the display 1041. The SIM card is an integrated circuit used to safely store International Mobile Subscriber Identity (IMSI) used for identifying a subscriber in a mobile telephoning apparatus such as a mobile phone and a computer and the related key. Many types of contact address information may be stored in the SIM card. A UE may include one or more SIM cards (eg USIM #A, USIM #B, etc.)

The memory 1010 is operably coupled with the processor 1020 and stores various types of information to operate the processor 1020. The memory may include Read-Only Memory (ROM), Random Access Memory (RAM), flash memory, a memory card, a storage medium, and/or other storage device. When the embodiment is implemented in software, the techniques described in the present disclosure may be implemented in a module (e.g., process, function, etc.) for performing the function described in the present disclosure. A module may be stored in the memory 1010 and executed by the processor 1020. The memory may be implemented inside of the processor 1020. Alternatively, the memory 1010 may be implemented outside of the processor 1020 and may be connected to the processor 1020 in communicative connection through various means which is well-known in the art.

The transceiver 1031 is operably connected to the processor 1020 and transmits and/or receives a radio signal. The transceiver 1031 includes a transmitter and a receiver. The transceiver 1031 may include a baseband circuit to process a radio frequency signal. The transceiver controls one or more antennas to transmit and/or receive a radio signal. In order to initiate a communication, the processor 1020 transfers command information to the transceiver 1031 to transmit a radio signal that configures a voice communication data. The antenna functions to transmit and receive a radio signal. When receiving a radio signal, the transceiver 1031 may transfer a signal to be processed by the processor 1020 and transform a signal in baseband. The processed signal may be transformed into audible or readable information output through the speaker 1042.

The speaker 1042 outputs a sound related result processed by the processor 1020. The microphone 1052 receives a sound related input to be used by the processor 1020.

A user inputs command information like a phone number by pushing (or touching) a button of the input unit 1053 or a voice activation using the microphone 1052. The processor 1020 processes to perform a proper function such as receiving the command information, calling a call number, and the like. An operational data on driving may be extracted from the SIM card or the memory 1010. Furthermore, the processor 1020 may display the command information or driving information on the display 1041 such that a user identifies it or for convenience.

Figure 15:
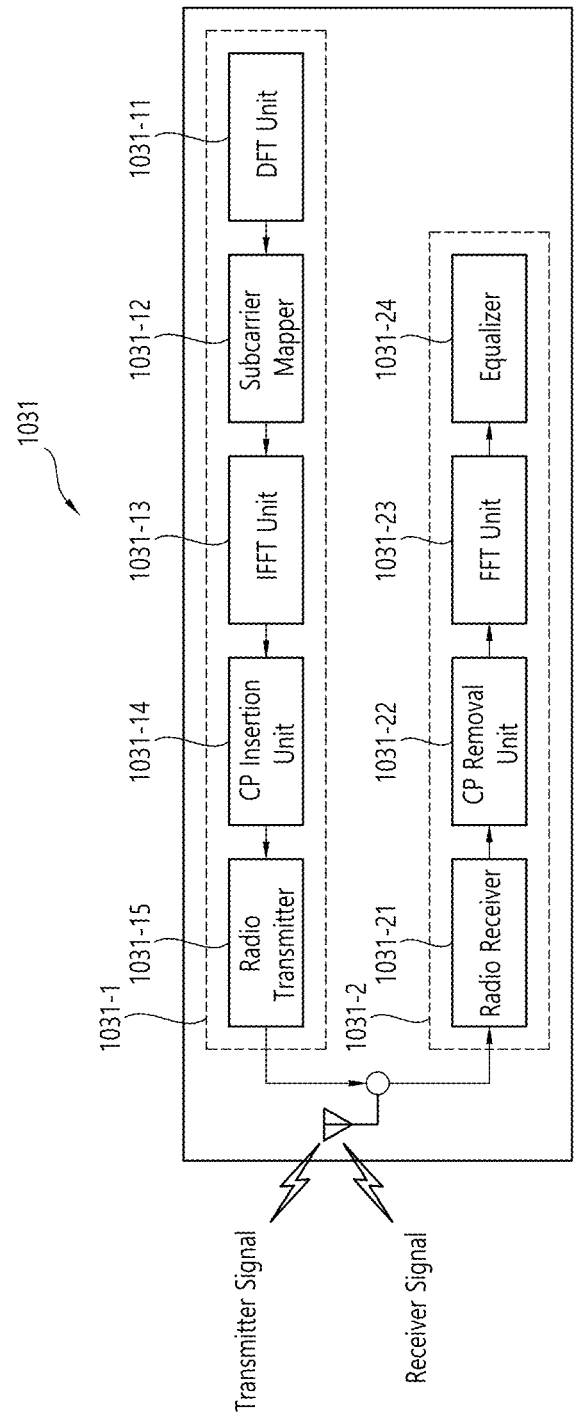
FIG. 15 is a detailed block diagram illustrating the transceiver of the first device shown in FIG. 12 or the transceiver of the device shown in FIG. 14 in detail.

FIG. 15 is a detailed block diagram illustrating the transceiver of the first device shown in FIG. 12 or the transceiver of the device shown in FIG. 14 in detail.

Referring to FIG. 15, the transceiver 1031 includes a transmitter 1031-1 and a receiver 1031-2. The transmitter 1031-1 includes a Discrete Fourier Transform (DFT) unit 1031-11, a subcarrier mapper 1031-12, an Inverse Fast Fourier Transform (IFFT) unit 1031-13 and a CP insertion unit 1031-14, and a radio transmitter 1031-15. The transmitter 1031-1 may further include a modulator. In addition, for example, a scramble unit (not shown), a modulation mapper (not shown), a layer mapper (not shown) and a layer permutator (not shown) may be further included and may be disposed before the DFT unit 1031-11. That is, in order to prevent an increase in the Peak-to-Average Power Ratio (PAPR), the transmitter 1031-1 passes information through the DFT 1031-11 before mapping a signal to a subcarrier. After subcarrier mapping, by the subcarrier mapper 1031-12, of the signal spread (or precoded in the same sense) by the DFT unit 1031-11, a signal on the time axis is made through the IFFT unit 1031-13.

The DFT unit 1031-11 outputs complex-valued symbols by performing DFT on input symbols. For example, when Ntx symbols are input (Ntx is a natural number), the DFT size is Ntx. The DFT unit 1031-11 may be referred to as a transform precoder. The subcarrier mapper 1031-12 maps the complex symbols to each subcarrier in the frequency domain. The complex symbols may be mapped to resource elements corresponding to resource blocks allocated for data transmission. The subcarrier mapper 1031-12 may be referred to as a resource element mapper. The IFFT unit 1031-13 outputs a baseband signal for data that is a time domain signal by performing IFFT on an input symbol. The CP insertion unit 1031-14 copies a part of the rear part of the baseband signal for data and inserts it in the front part of the baseband signal for data. Inter-Symbol Interference (ISI) and Inter-Carrier Interference (ICI) are prevented through CP insertion, so that orthogonality can be maintained even in a multi-path channel On the other hand, the receiver 1031-2 includes a radio receiver 1031-21, a CP remover 1031-22, an FFT unit 1031-23, and an equalizer 1031-24, etc. The radio receiver 1031-21, the CP removing unit 1031-22, and the FFT unit 1031-23 of the receiver 1031-2 performs the reverse function of the radio transmitter 1031-15, the CP insertion unit 1031-14 and the IFFT unit 1031-13 of the transmitter 1031-1. The receiver 1031-2 may further include a demodulator.

Figure 16:
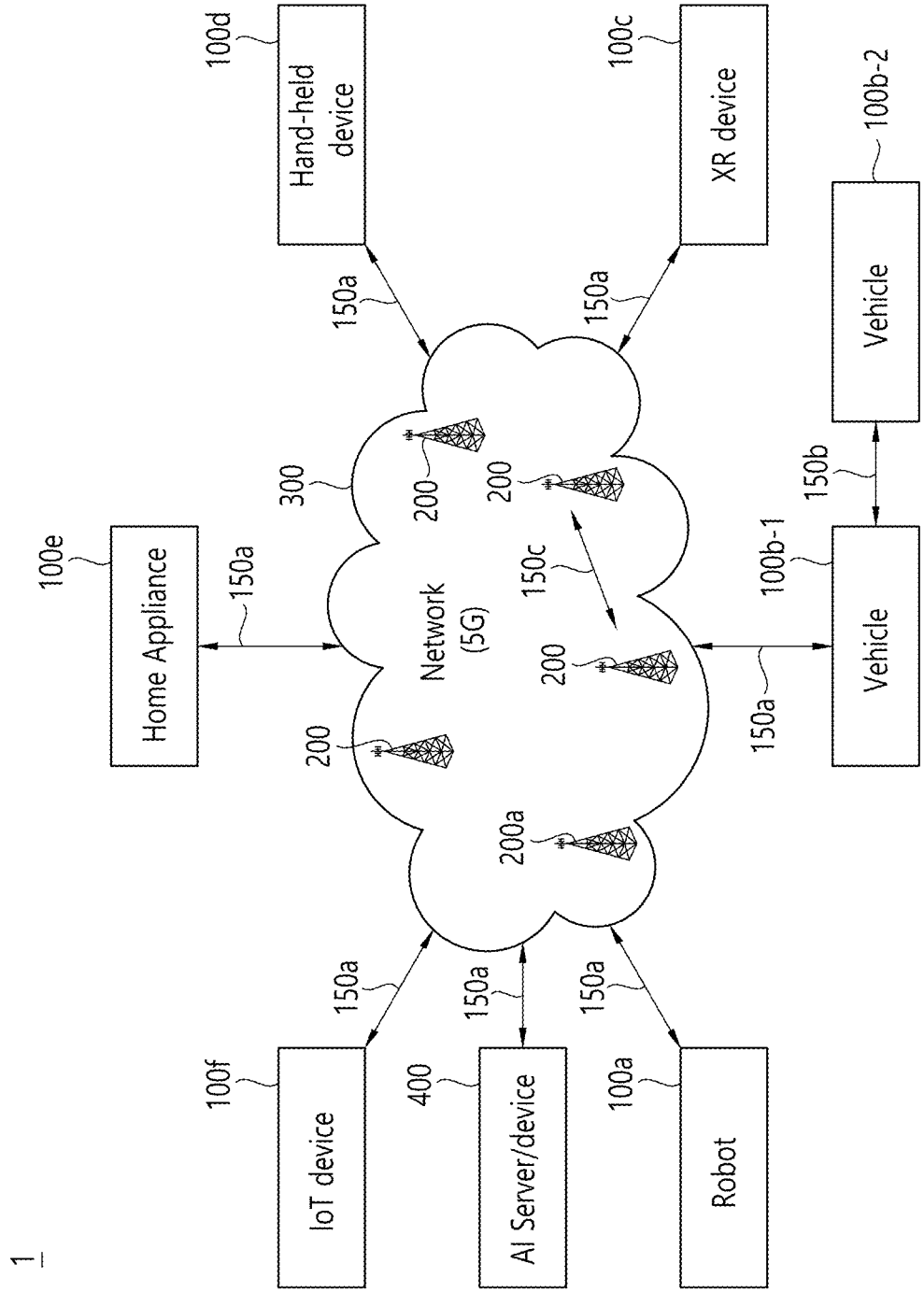
FIG. 16 illustrates a communication system 1 applied to the disclosure of the present specification.

FIG. 16 illustrates a communication system 1 applied to the disclosure of the present specification.

Referring to FIG. 16, the communication system 1 applied to the disclosure of the present specification includes a wireless device, a base station, and a network. Here, the wireless device refers to a device that performs communication using a radio access technology (e.g., 5G New RAT (NR)), Long-Term Evolution (LTE)), and may be referred to as a communication/wireless/5G device. Although not limited thereto, the wireless device may include a robot 100a, a vehicle 100b-1, 100b-2, an eXtended Reality (XR) device 100c, a hand-held device 100d, and a home appliance 100e, an Internet-of-Things (IoT) device 100f, and an AI device/server 400. For example, the vehicle may include a vehicle equipped with a wireless communication function, an autonomous driving vehicle, a vehicle capable of performing inter-vehicle communication, and the like. Here, the vehicle may include an Unmanned Aerial Vehicle (UAV) (e.g., a drone). XR devices include Augmented Reality (AR)/Virtual Reality (VR)/Mixed Reality (MR) devices, and may be implemented in the form of a Head-Mounted Device (HMD), a Head-Up Display (HUD) provided in a vehicle, a television, a smartphone, a computer, a wearable device, a home appliance, a digital signage, a vehicle, a robot, and the like. The hand-held device may include a smartphone, a smart pad, a wearable device (e.g., a smart watch, smart glasses), a computer (e.g., a laptop computer), and the like. Home appliances may include a TV, a refrigerator, a washing machine, and the like. The IoT device may include a sensor, a smart meter, and the like. For example, the base station and the network may be implemented as a wireless device, and the specific wireless device 200a may operate as a base station/network node to other wireless devices.

Here, the wireless communication technology implemented in the wireless devices 100a to 100f, 400, and 100 and 200 of FIG. 13 of the present specification may include LTE, NR, and 6G as well as the narrowband Internet of Things for low-power communication. At this time, for example, NB-IoT technology may be an example of LPWAN (Low Power Wide Area Network) technology, and may be implemented in standards such as LTE Cat NB1 and/or LTE Cat NB2, and is not limited to the above-mentioned names Additionally or alternatively, the wireless communication technology implemented in the wireless devices 100a to 100f, 400, 100 and 200 in FIG. 13 of the present specification may perform communication based on the LTE-M technology. In this case, as an example, the LTE-M technology may be an example of an LPWAN technology, and may be called by various names such as enhanced machine type communication (eMTC). For example, LTE-M technology may be implemented in at least one of various standards such as 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M, and is not limited to the above-described name. Additionally or alternatively, the wireless communication technology implemented in the wireless devices 100a to 100f, 400, and 100 and 200 of FIG. 13 of the present specification may include at least any one of ZigBee, Bluetooth, and low-power wide area network (Low) in consideration of low-power communication. Power Wide Area Network (LPWAN), but is not limited to the above-described name. For example, the ZigBee technology can create PAN (personal area networks) related to small/low-power digital communication based on various standards such as IEEE 802.15.4, and can be called by various names.

The wireless devices 100a to 100f may be connected to the network 300 via the base station 200. An Artificial Intelligence (AI) technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the base stations 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., Vehicle-to-Vehicle (V2V)/Vehicle-to-Everything (V2X) communication). The IoT device (e.g., a sensor) may perform direct communication with other IoT devices (e.g., sensors) or other wireless devices 100a to 100f.

Wireless communication/connections 150a, 150b and 150c may be established between wireless device 100a to 100f and base station 200, between base station 200/base station 200. Herein, the wireless communication/connections may be established through various RATs (e.g., 5G NR) such as uplink/downlink communication 150a, sidelink communication (or Device-to-Device (D2D) communication) 150b, inter-base station communication 150c (e.g., relay, Integrated Access and Backhaul (IAB)), etc. The wireless devices 100a to 100f and the base station 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

In the above, preferred embodiments have been exemplarily described, but the disclosure of the present specification is not limited to such specific embodiments. Therefore, the disclosure of the present specification may be modified, changed, or improved in various forms within the present specification and the scope set forth in the claims.

In the exemplary system described above, the methods are described on the basis of a flowchart as a series of steps or blocks, but are not limited to the order of the steps described, some steps may occur in a different order or concurrent with other steps as described above. In addition, those skilled in the art will understand that the steps shown in the flowchart are not exclusive and that other steps may be included or that one or more steps of the flowchart may be deleted without affecting the scope of rights.

The claims described herein may be combined in various ways. For example, the technical features of the method claims of the present specification may be combined and implemented as an apparatus, and the technical features of the apparatus claims of the present specification may be combined and implemented as a method. In addition, the technical features of the method claim of the present specification and the technical features of the apparatus claim of the present specification may be combined to be implemented as an apparatus, and the technical features of the method claim of the present specification and the technical features of the apparatus claim of the present specification may be combined and implemented as a method.

What is claimed is:

1. A method comprising:
   wherein a user equipment (UE) with multiple subscriber identity modules maintains simultaneous separate registration states with networks associated with the multiple subscriber identity modules,
   wherein the multiple subscriber identity modules include a first subscriber identity module and a second subscriber identity module,
   wherein networks include a first network and a second network,
   wherein the first network is associated with the first subscriber identity module, and
   wherein the second network is associated with the second subscriber identity module,
   receiving, by an access management node of the first network, a registration request message from the UE;
   transmitting, by the access management node of the first network, a registration accept message to the UE in response to the registration request message;
   receiving, by the access management node of the first network, information that the UE intends to leave a connected state in the first network from the UE;
   based on a session management node of the first network having pending downlink data, receiving, by the access management node of the first network, a message from the session management node of the first network; and
   transmitting, by the access management node of the first network, a paging message,
   wherein the registration request message includes a mobile terminating service configuration including a list of services that the UE wants to be notified in the first network when the UE gets services in the second network, and
   wherein the paging message is transmitted based on the pending downlink data being associated with a service in the list of services included in the mobile terminating service configuration.

2. The method of claim 1,
   wherein the registration accept message includes a mobile terminating service configuration accepted information that the mobile terminating service configuration has been accepted.

3. The method of claim 1,
   wherein the method further comprises transmitting a failure indication to the session management node of the first network, and
   wherein the failure indication is transmitted based on the pending downlink data not being associated with a service in the list of services included in the mobile terminating service configuration.

4. The method of claim 1, further comprising:
   receiving information that the UE is returning to the first network from the UE.

5. The method of claim 4, further comprising:
   when the information that the UE is returning to the first network is received, even if the message is received from the session management node of the first network, the mobile terminating service configuration is not considered.

6. A method comprising:
wherein a user equipment (UE) with multiple subscriber identity modules maintains simultaneous separate registration states with networks associated with the multiple subscriber identity modules,
wherein the multiple subscriber identity modules include a first subscriber identity module and a second subscriber identity module,
wherein networks include a first network and a second network,
wherein the first network is associated with the first subscriber identity module, and
wherein the second network is associated with the second subscriber identity module,
transmitting, by the UE, a registration request message to an access management node of the first network;
receiving, by the UE, a registration accept message from the access management node of the first network in response to the registration request message;
transmitting, by the UE, information that the UE intends to leave a connected state in the first network to the access management node of the first network; and
receiving, by the UE, a paging message,
wherein the registration request message includes a mobile terminating service configuration including a list of services that the UE wants to be notified in the first network when the UE gets services in the second network, and
wherein the paging message is received based on pending downlink data in a session management node of the first network being associated with a service in the list of services included in the mobile terminating service configuration.

7. The method of claim 6, further comprising:
transmitting information that the UE is returning to the first network to the access management node of the first network.

8. The method of claim 7,
wherein the information that the UE is returning to the first network is used by the access management node of the first network not to consider the mobile terminating service configuration.

9. An access management node of a first network node comprising:
at least one processor; and
at least one memory storing instructions and operably electrically connectable to the at least one processor,
wherein the operations performed based on an execution of the instructions by the at least one processor include:
wherein a user equipment (UE) with multiple subscriber identity modules maintains simultaneous separate registration states with networks associated with the multiple subscriber identity modules,
wherein the multiple subscriber identity modules include a first subscriber identity module and a second subscriber identity module,
wherein networks include a first network and a second network,
wherein the first network is associated with the first subscriber identity module, and
wherein the second network is associated with the second subscriber identity module,
receiving a registration request message from the UE;
transmitting a registration accept message to the UE in response to the registration request message;
receiving information that the UE intends to leave a connected state in the first network from the UE;
based on a session management node of the first network having pending downlink data, receiving a message from the session management node of the first network; and
transmitting a paging message,
wherein the registration request message includes a mobile terminating service configuration including a list of services that the UE wants to be notified in the first network when the UE gets services in the second network, and
wherein the paging message is transmitted based on the pending downlink data being associated with a service in the list of services included in the mobile terminating service configuration.

\* \* \* \* \*